United States Patent
Chan et al.

(10) Patent No.: US 12,477,502 B2
(45) Date of Patent: Nov. 18, 2025

(54) SOUNDING FOR TRIGGER-BASED RANGING

(71) Applicant: QUALCOMM Incorporated, San Diego, CA (US)

(72) Inventors: Patrick Poon-Cheuk Chan, San Jose, CA (US); Xiaoxin Zhang, Sunnyvale, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/350,562

(22) Filed: Jul. 11, 2023

(65) Prior Publication Data
US 2025/0024406 A1    Jan. 16, 2025

(51) Int. Cl.
  *H04W 64/00*    (2009.01)
  *H04L 5/00*    (2006.01)

(52) U.S. Cl.
  CPC .......... *H04W 64/00* (2013.01); *H04L 5/0007* (2013.01); *H04L 5/0048* (2013.01)

(58) Field of Classification Search
  CPC ..... H04W 64/00; H04L 5/0007; H04L 5/0048
  See application file for complete search history.

(56) References Cited

U.S. PATENT DOCUMENTS

2025/0203589 A1 *  6/2025  Iwai .................. H04W 72/0453

\* cited by examiner

*Primary Examiner* — Curtis B Odom
(74) *Attorney, Agent, or Firm* — Holland & Hart LLP

(57) ABSTRACT

This disclosure provides methods, components, devices, and systems for sounding for trigger-based ranging. Some aspects more specifically relate to a first wireless device dividing a frequency bandwidth available for ranging procedures into a plurality of subbands in accordance with orthogonal frequency-division multiple access (OFDMA) techniques. In some implementations, the first wireless device may transmit a trigger frame that assigns a subband to a respective neighbor wireless device. Each respective neighbor wireless device may transmit, during a same time occasion, a respective sounding signal via each respective subband allocated to the respective neighbor wireless device. In some implementations, the first wireless device may perform sounding procedures using combined multiple input multiple output (MIMO) and OFDMA techniques, where each neighbor wireless device may be assigned a respective spatial stream. Accordingly, the first wireless device may support sounding procedures for larger quantities of neighbor wireless devices.

30 Claims, 11 Drawing Sheets

| ID 702 | Length 704 | AID/ RSID 706 | Device Class 708 | MIMO 710 | Padding Duration 712 | Max Session Expiry 714 | Passive Ranging 716 | Reserved 718 | Available Window 720 | OFDMA 722 | OFDMA + MIMO 724 | RU Size 726 |
|---|---|---|---|---|---|---|---|---|---|---|---|---|

*Figure 7*

SOUNDING FOR TRIGGER-BASED RANGING

TECHNICAL FIELD

This disclosure relates to wireless communication and, more specifically, to sounding for trigger-based ranging procedures.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, wireless communication devices may benefit from having information regarding the location or proximities of the various other devices (such as APs or STAs) within the coverage area. In some implementations, relevant distances may be determined (such as calculated or computed) using trigger-based ranging procedures.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless device. The first wireless device may include at least one processor, at least one memory coupled with the at least one processor, and instructions stored in the at least one memory. The instructions may be executable by the at least one processor to cause the first wireless device to transmit, by the first wireless device, a first trigger frame to trigger a first set of multiple neighbor wireless devices to each transmit an OFDMA sounding signal during a first time occasion, the first trigger frame indicating a respective subband of a set of multiple subbands of a frequency bandwidth allocated to a respective neighbor wireless device of the first set of multiple neighbor wireless devices, receive, during the first time occasion and via the set of multiple subbands, a set of multiple OFDMA sounding signals from the first set of multiple neighbor wireless devices, and transmit at least one measurement report indicating location information for at least one neighbor wireless device of the first set of multiple neighbor wireless devices based on the set of multiple OFDMA sounding signals.

Another innovative aspect of the subject matter described in this disclosure can be implemented in a method for wireless communication. The method may include transmitting, by the first wireless device, a first trigger frame to trigger a first set of multiple neighbor wireless devices to each transmit an orthogonal frequency division multiple access (OFDMA) sounding signal during a first time occasion, the first trigger frame indicating a respective subband of a set of multiple subbands of a frequency bandwidth allocated to a respective neighbor wireless device of the first set of multiple neighbor wireless devices, receiving, during the first time occasion and via the set of multiple subbands, a set of multiple OFDMA sounding signals from the first set of multiple neighbor wireless devices, and transmitting at least one measurement report indicating location information for at least one neighbor wireless device of the first set of multiple neighbor wireless devices based on the set of multiple OFDMA sounding signals.

In some examples, the method and first wireless device may further include operations, features, means, or instructions for transmitting, by the first wireless device, a second trigger frame to trigger a second set of multiple neighbor wireless devices to each transmit an OFDMA sounding signal during a second time occasion, the second trigger frame indicating a respective subband of the set of multiple subbands of the frequency bandwidth allocated to a respective neighbor wireless device of the second set of multiple neighbor wireless devices and receiving, during the second time occasion and via the set of multiple subbands, a set of multiple OFDMA sounding signals from the second set of multiple neighbor wireless devices.

In some examples, the method and first wireless device may further include operations, features, means, or instructions for transmitting a polling message via the frequency bandwidth to determine a total quantity of neighbor wireless devices participating in a location measurement procedure and receiving, in response to the polling message, a respective polling response message from each neighbor wireless device of the first set of multiple neighbor wireless devices and the second set of multiple neighbor wireless devices, where the first trigger frame and the second trigger frame may be transmitted during separate time occasions based on the total quantity of neighbor wireless devices.

In some examples of the method, wireless devices, and non-transitory computer-readable medium described herein, the first trigger frame indicates multiple spatial streams assigned to a respective neighbor wireless device of the first set of multiple neighbor wireless devices for transmitting a respective OFDMA sounding signal via a respective subband of the set of multiple subbands.

In some examples of the method and the first wireless device, the first trigger frame indicates a single spatial stream, of a set of multiple spatial streams, assigned to a respective neighbor wireless device of the first set of multiple neighbor wireless devices for transmitting a respective OFDMA sounding signal via a respective subband of the set of multiple subbands.

In some examples of the method and the first wireless device, a quantity of the first set of multiple neighbor wireless devices to which the first trigger frame may be transmitted may be based on a bandwidth puncturing scheme.

In some examples of the method and the first wireless device, a first subband of the set of multiple subbands may have a first bandwidth size smaller than a second bandwidth size associated with a second subband of the set of multiple subbands and the first trigger frame indicates a first neighbor wireless device of the first set of multiple neighbor wireless devices that the first subband may have the first bandwidth size.

In some examples, the method and first wireless device may further include operations, features, means, or instructions for transmitting, to the first set of multiple neighbor wireless devices, an announcement message indicating transmission of a sounding signal, transmitting, via the frequency bandwidth, the sounding signal to the first set of multiple neighbor wireless devices, and receiving, from at least one neighbor wireless device of the first set of multiple neighbor wireless devices, a second measurement report that indicates an estimation of a time of arrival of the sounding signal and an error associated with the estimation of the time of arrival.

In some examples of the method and the first wireless device, the second measurement report indicates that the at least one neighbor wireless device estimated the time of arrival of the sounding signal based on receiving the sounding signal via the frequency bandwidth.

In some examples of the method and the first wireless device, the second measurement report indicates that the at least one neighbor wireless device estimated the time of arrival of the sounding signal based on receiving the sounding signal via a respective subband of the set of multiple subbands.

In some examples, the method and first wireless device may further include operations, features, means, or instructions for transmitting or receiving a request message indicating a capability to support OFDMA sounding signals for a location measurement procedure.

In some examples, the method and first wireless device may further include operations, features, means, or instructions for transmitting or receiving a request message indicating a capability to support sounding signals using combined OFDMA and multiple-input, multiple-output (MIMO) techniques for a location measurement procedure.

In some examples, the method and first wireless device may further include operations, features, means, or instructions for receiving one or more request messages, each request message indicating a bandwidth size, where the frequency bandwidth may be divided into the set of multiple subbands based on the one or more request messages indicating the bandwidth size, a respective subband of the set of multiple subbands having a size equal to or larger than each bandwidth size of each respective request message of the one or more request messages.

In some examples of the method and the first wireless device, a quantity of the first set of multiple neighbor wireless devices exceeds a quantity of antennas of the first wireless device. In some examples of the method and the first wireless device, the first wireless device includes a station or an access point. In some examples of the method and the first wireless device, each neighbor wireless device of the first set of multiple neighbor wireless devices includes a station or an access point.

Another innovative aspect of the subject matter described in this disclosure can be implemented in a first neighbor wireless device. The first neighbor wireless device may include at least one processor, at least one memory coupled with the at least one processor, and instructions stored in the at least one memory. The instructions may be executable by the at least one processor to cause the first neighbor wireless device to receive, from a first wireless device, a trigger frame to trigger a set of multiple neighbor wireless devices, the set of multiple neighbor wireless devices including the first neighbor wireless device, to transmit an OFDMA sounding signal during a first time occasion, the trigger frame indicating a first subband of a set of multiple subbands of a frequency bandwidth allocated to the first neighbor wireless device, transmit, during the first time occasion and via the first subband, one or more OFDMA sounding signals to the first wireless device, and receive a measurement report indicating location information for the first neighbor wireless device based on transmitting the one or more OFDMA sounding signals.

Another innovative aspect of the subject matter described in this disclosure can be implemented in a method for wireless communication. The method may include receiving, from a first wireless device, a trigger frame to trigger a set of multiple neighbor wireless devices, the set of multiple neighbor wireless devices including the first neighbor wireless device, to transmit an OFDMA sounding signal during a first time occasion, the trigger frame indicating a first subband of a set of multiple subbands of a frequency bandwidth allocated to the first neighbor wireless device, transmitting, during the first time occasion and via the first subband, one or more OFDMA sounding signals to the first wireless device, and receiving a measurement report indicating location information for the first neighbor wireless device based on transmitting the one or more OFDMA sounding signals.

In some examples of the method and the first neighbor wireless device, the trigger frame indicates multiple spatial streams assigned to the first neighbor wireless device for transmitting a respective OFDMA sounding signal via the first subband.

In some examples of the method and the first neighbor wireless device, the trigger frame indicates a single spatial stream, of a set of multiple spatial streams, assigned to the first neighbor wireless device for transmitting a respective OFDMA sounding signal via the first subband.

In some examples, the method and first neighbor wireless device may further include operations, features, means, or instructions for receiving a polling message via the frequency bandwidth associated with determining a total quantity of neighbor wireless devices participating in a location measurement procedure and transmitting, in response to the polling message, a polling response message to the first wireless device.

In some examples of the method and the first neighbor wireless device, the first subband may have a first bandwidth size smaller than a second bandwidth size associated with a second subband of the set of multiple subbands assigned to a second neighbor wireless device of the set of multiple neighbor wireless devices and the trigger frame indicates the first neighbor wireless device that the first subband may have the first bandwidth size.

In some examples, the method and first neighbor wireless device may further include operations, features, means, or instructions for estimating a time of arrival of a sounding signal based on receiving an announcement message from the first wireless device, receiving the sounding signal from the first wireless device, and transmitting, to the first wireless device, a second measurement report indicating an estimated time of arrival of the sounding signal and an error associated with the estimated time of arrival.

In some examples of the method and the first neighbor wireless device, the second measurement report indicates that the first neighbor wireless device estimated the time of arrival of the sounding signal based on receiving the sounding signal on the frequency bandwidth.

In some examples of the method and the first neighbor wireless device, the second measurement report indicates that the first neighbor wireless device estimated the time of arrival of the sounding signal based on receiving the sounding signal on the first subband.

In some examples, the method and first neighbor wireless device may further include operations, features, means, or instructions for transmitting or receiving a request message indicating a capability to support OFDMA sounding signals for a location measurement procedure.

In some examples, the method and first neighbor wireless device may further include operations, features, means, or instructions for transmitting or receiving a request message indicating a capability to support sounding signals using combined OFDMA and MIMO techniques for a location measurement procedure.

In some examples, the method and first neighbor wireless device may further include operations, features, means, or instructions for transmitting a request message including a bandwidth size, where the first subband may have a size equal to or larger than the bandwidth size based on transmitting the request message.

In some examples of the method and the first neighbor wireless device, a quantity of the set of multiple neighbor wireless devices exceeds a quantity of antennas of the first wireless device. In some examples of the method and the first neighbor wireless device, the first wireless device includes a station or an access point. In some examples of the method and the first neighbor wireless device, the first neighbor wireless device includes a station or an access point.

Details of one or more implementations of the subject matter described in this disclosure are set forth in the accompanying drawings and the description below. Other features and aspects may become apparent from the description, the drawings, and the claims. Note that the relative dimensions of the following figures may not be drawn to scale.

BRIEF DESCRIPTION OF THE DRAWINGS

FIG. 7 shows an example of a subelement that supports sounding for trigger-based ranging according to some aspects of the present disclosure.

Like reference numbers and designations in the various drawings indicate like elements.

DETAILED DESCRIPTION

Figure 1:
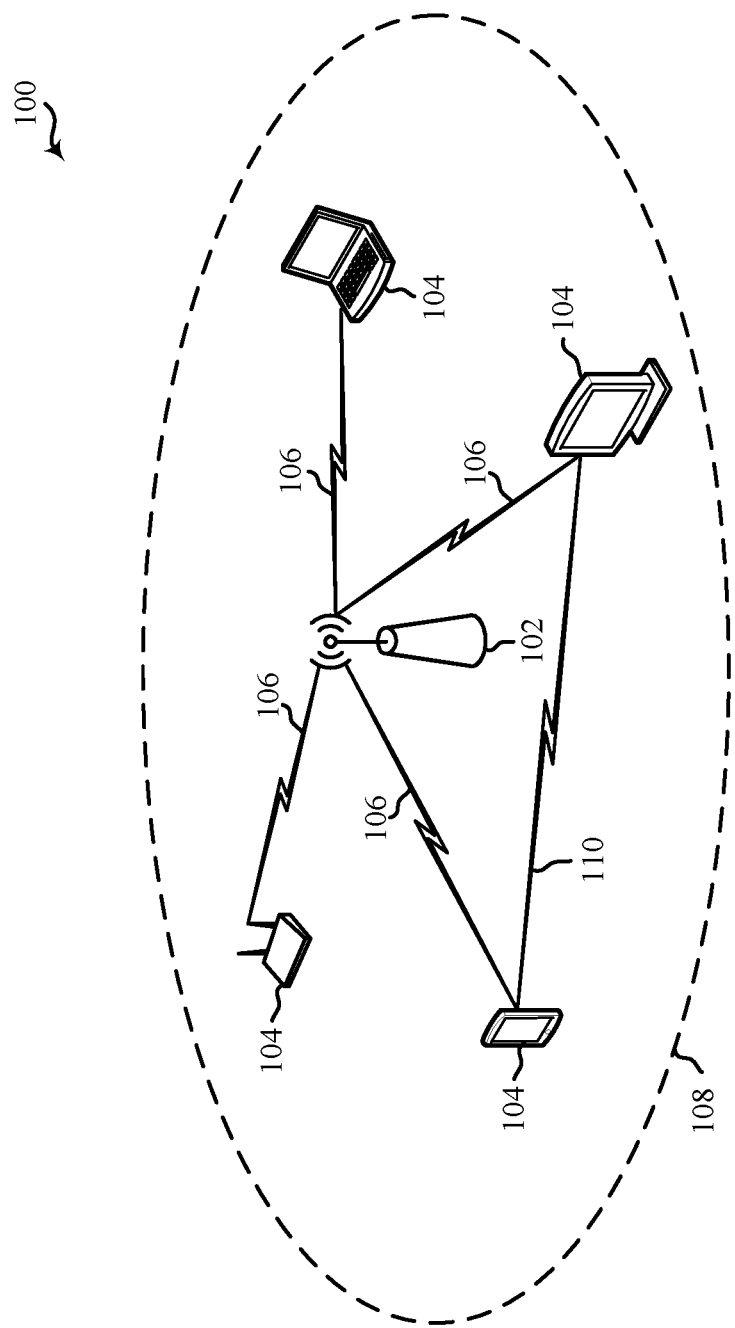
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), OFDMA, single-carrier FDMA (SC-FDMA), spatial division multiple access (SDMA), rate-splitting multiple access (RSMA), multi-user shared access (MUSA), single-user (SU) MIMO and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to sounding for trigger-based ranging procedures. Some aspects more specifically relate to a first wireless device dividing a frequency bandwidth available for ranging procedures into a plurality of subbands in accordance with OFDMA techniques. In some implementations, the first wireless device may transmit a trigger frame that assigns a subband to a respective neighbor wireless device. Each respective neighbor wireless device may transmit, during a same time occasion, a respective sounding signal via each respective subband allocated to the respective neighbor wireless device. In some implementations, the first wireless device may perform sounding procedures using combined MU-MIMO and OFDMA techniques, where each neighbor wireless device may be assigned a respective spatial stream. Accordingly, the first wireless device may support sounding procedures for larger quantities of neighbor wireless devices, such as quantities of neighbor wireless devices exceeding a quantity of antennas of the first wireless device.

Particular aspects of the subject matter described in this disclosure can be implemented to realize one or more of the following. In some implementations, by supporting sounding procedures for larger quantities of neighbor wireless devices, the first wireless device may reduce a time difference between transmission of a first sounding signal and transmission of location measurement reports by the neighbor wireless devices. This may reduce clock drift associated with the transmission of the location measurement reports, which may improve the accuracy of location measurements associated with the trigger-based ranging procedures. Further, the techniques discussed herein may reduce signaling overhead associated with performing sounding procedures, which may increase efficiency in location report gathering and reduce data communication channel disruptions due to location report gathering. Moreover, the use of OFDMA sounding signals may increase spectrum efficiency, and may support narrower bandwidths for resource units, which may increase a range associated with sounding procedures.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and 802.11bn). The WLAN 100 may include numerous wireless communication devices such as a wireless AP 102 and multiple wireless STAs1. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE or 5G NR) can be further increased by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 gigahertz (GHz) band, the 5 GHz band, the 60 GHz band, the 3.6 GHz band, and the 900 megahertz (MHz) band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.1 lac, 802.1 lax and 802.11be standard amendments may be transmitted over the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

APs 102 and STAs 104 that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (such as in the form of a null data packet (NDP)) to the beamformee. An NDP is a PPDU without any data field. The beamformee may perform measurements for each of the $N_{Tx} \times N_{Rx}$, sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (such as identify, detect, ascertain, calculate, or compute) how to transmit a signal on each of its antennas to perform beamforming. For example, the steering matrix may be indicative of a phase shift or a power level. to use to transmit a respective signal on each of the beamformer's antennas.

A transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially beneficial in MU transmission contexts in which it is particularly important to reduce inter-user interference.

An AP 102 may be configured to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the uplink (UL) and downlink (DL) channels have reciprocal impulse responses (that is, that there is channel reciprocity). For examples, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some implementations, multiple APs 102 may transmit to one or more STAs 104 at a time utilizing a distributed MU-MIMO scheme. Examples of such distributed MU-MIMO transmissions include coordinated beamforming (CBF) and joint transmission (JT). With CBF, signals (such as data streams) for a given STA 104 may be transmitted by only a single AP 102. However, the coverage areas of neighboring APs 102 may overlap, and signals transmitted by a given AP 102 may reach the STAs 104 in OBSSs associated with neighboring APs 102 as OBSS signals. CBF allows multiple neighboring APs 102 to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs 104 in OBSSs such that any signals received at an OBSS STA 104 are of sufficiently low power to limit the interference at the STA 104. To accomplish this, an inter-BSS coordination set may be defined between the neighboring APs 102, which contains identifiers of all APs 102 and STAs 104 participating in CBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. Accordingly, the APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

APs 102 and STAs 104 can support multi-user (MU) communications; that is, concurrent transmissions from one device to each of multiple devices (such as multiple simultaneous downlink (DL) communications from an AP 102 to corresponding STAs 104), or concurrent transmissions from multiple devices to a single device (such as multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP 102 also may designate one or more random access (RA) RUs that unscheduled STAs 104 may contend for.

As Wi-Fi is not the only technology operating in the 6 GHz band, the use of multiple RUs in conjunction with channel puncturing may enable the use of large bandwidths such that high throughput is possible while avoiding transmitting on frequencies that are locally unauthorized due to incumbent operation. Puncturing is a wireless communication technique that enables a wireless communication device (such as an AP 102 or a STA 104) to transmit and receive wireless communications over a portion of a wireless channel exclusive of one or more particular subchannels (hereinafter also referred to as "punctured subchannels"). Static puncturing specifically may be used to exclude one or more subchannels from the transmission of a PPDU, including the signaling of the preamble, to avoid interference from a static source such as an incumbent system. The transmitting device may puncture the subchannels on which there is interference and, in essence, spread the PPDU to cover the remaining portion of the bandwidth of the channel. For example, if a wireless communication device determines (such as detects, identifies, ascertains, or calculates) that a 20 MHz subchannel of a 160 MHz or 320 MHz wireless channel is consistently occupied, the wireless communication device can use channel puncturing to avoid communicating over the occupied subchannel while still utilizing the remaining 140 MHz or 300 MHz of bandwidth. Accordingly, channel puncturing allows a wireless communication device to improve or maximize its throughput by utilizing more of the available spectrum that would otherwise have been idle. Static puncturing in particular makes it possible to consistently use wide channels in environments where there is insufficient contiguous spectrum available.

Figure 2:
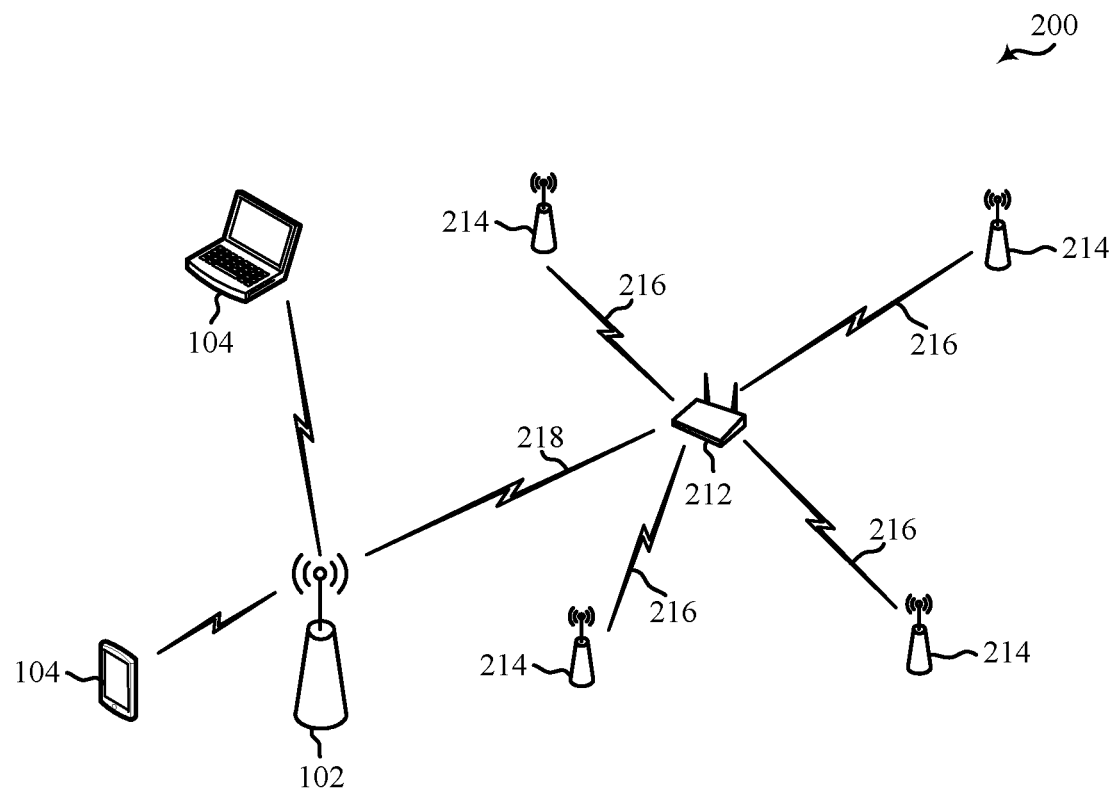
FIG. 2 shows a pictorial diagram of another example wireless communication network.

FIG. 2 shows a pictorial diagram of another example wireless communication network 200. According to some aspects, the wireless communication network 200 can be an example of a mesh network, an IoT network or a sensor network in accordance with one or more of the IEEE 802.11 family of wireless communication protocol standards (including the 802.11ah amendment). The wireless network 200 may include multiple wireless communication devices 214. The wireless communication devices 214 may represent various devices such as display devices (such as TVs, computer monitors, navigation systems, among others), music or other audio or stereo devices, remote control devices ("remotes"), printers, kitchen or other household appliances, among other examples.

In some implementations, the wireless communication devices 214 sense, measure, collect or otherwise obtain and process data and transmit such raw or processed data to an intermediate device 212 for subsequent processing or distribution. Additionally, or alternatively, the intermediate device 212 may transmit control information, digital content (such as audio or video data), configuration information or other instructions to the wireless communication devices 214. The intermediate device 212 and the wireless communication devices 214 can communicate with one another via wireless communication links 216. In some implementations, the wireless communication links 216 include Bluetooth links or other PAN or short-range communication links.

In some implementations, the intermediate device 212 also may be configured for wireless communication with other networks such as with a Wi-Fi WLAN or a wireless (such as cellular) wide area network (WWAN), which may, in turn, provide access to external networks including the Internet. For example, the intermediate device 212 may associate and communicate, over a Wi-Fi link 218, with an AP 102 of a WLAN network, which also may serve various STAs 104. In some implementations, the intermediate device 212 is an example of a network gateway, for example, an IoT gateway. In such a manner, the intermediate device 212 may serve as an edge network bridge providing a Wi-Fi core backhaul for the IoT network including the wireless communication devices 214. In some implementations, the intermediate device 212 can analyze, preprocess and aggregate data received from the wireless communication devices 214 locally at the edge before transmitting it to other devices or external networks via the Wi-Fi link 218. The intermediate device 212 also can provide additional security for the IoT network and the data it transports.

Aspects of transmissions may vary according to a distance between a transmitter (such as an AP 102 or a STA 104) and a receiver (such as another AP 102 or STA 104). Wireless communication devices may generally benefit from having information regarding the location or proximities of the various STAs 104 within the coverage area. In some implementations, relevant distances may be determined (such as calculated or computed) using round trip time (RTT)-based ranging procedures. Additionally, in some examples, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 3:
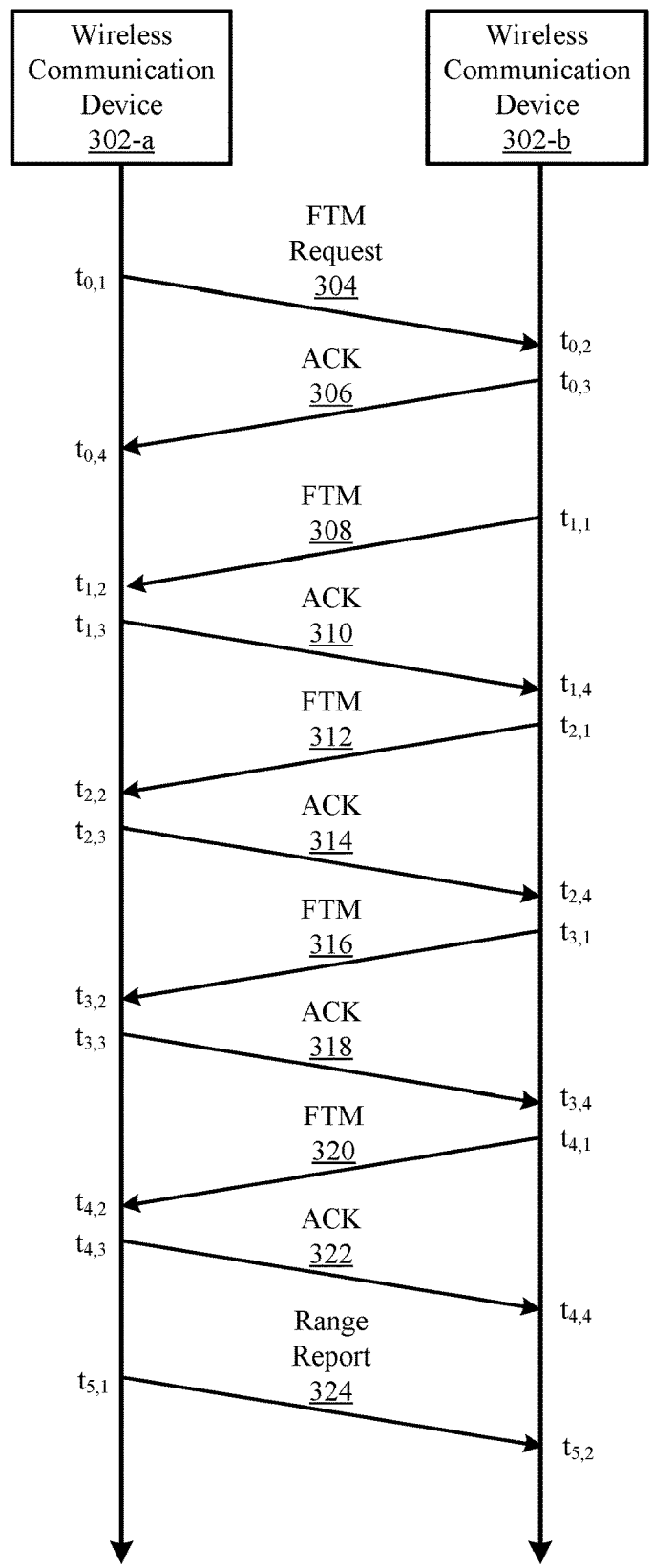
FIG. 3 shows a timing diagram illustrating an example process for performing a ranging operation.

FIG. 3 shows a timing diagram illustrating an example process for performing a ranging operation 300. The process for the ranging operation 300 may be conjunctively performed by two wireless communication devices 302-$a$ and 302-$b$ in accordance with the IEEE 802.11REVme standards, which may each be an example of an AP 102 or a STA 104.

The ranging operation 300 begins with the first wireless communication device 302-$a$ transmitting an initial FTM range request frame 304 at time $t_{0,1}$. Responsive to successfully receiving the FTM range request frame 304 at time $t_{0,2}$, the second wireless communication device 302-$b$ responds by transmitting a first ACK 306 at time $t_{0,3}$, which the first wireless communication device 302-$a$ receives at time $t_{0,4}$. The first wireless communication device 302-$a$ and the second wireless communication device 302-$b$ exchange one or more FTM bursts, which may each include multiple exchanges of FTM action frames (hereinafter simply "FTM frames") and corresponding ACKs. One or more of the FTM request frame 304 and the FTM action frames (hereinafter simply "FTM frames") may include FTM parameters specifying various characteristics of the ranging operation 300.

In the example shown in FIG. 3, in a first exchange, beginning at time $t_{1,1}$, the second wireless communication device 302-$b$ transmits a first FTM frame 308. The second wireless communication device 302-$b$ records the time $t_{1,1}$ as the time of departure (TOD) of the first FTM frame 308. The first wireless communication device 302-$a$ receives the first FTM frame 308 at time $t_{1,2}$ and transmits a first acknowledgement frame (ACK) 310 to the second wireless communication device 302-$b$ at time $t_{1,3}$. The first wireless communication device 302-$a$ records the time $t_{1,2}$ as the time of arrival (TOA) of the first FTM frame 308, and the time $t_{1,3}$ as the TOD of the first ACK 310. The second wireless communication device 302-$b$ receives the first ACK 310 at time $t_{1,4}$ and records the time $t_{1,4}$ as the TOA of the first ACK 310.

Similarly, in a second exchange, beginning at time $t_{2,1}$, the second wireless communication device 302-$b$ transmits a second FTM frame 312. The second FTM frame 312 includes a first field indicating the TOD of the first FTM frame 308 and a second field indicating the TOA of the first ACK 310. The first wireless communication device 302-$a$ receives the second FTM frame 312 at time $t_{2,2}$ and transmits a second ACK 314 to the second wireless communication device 302-$b$ at time $t_{2,3}$. The second wireless communication device 302-$b$ receives the second ACK 314 at time $t_{2,4}$. Similarly, in a third exchange, beginning at time $t_{3,1}$, the second wireless communication device 302-$b$ transmits a third FTM frame 316. The third FTM frame 316 includes a first field indicating the TOD of the second FTM frame 312 and a second field indicating the TOA of the second ACK 314. The first wireless communication device 302-$a$ receives the third FTM frame 316 at time $t_{3,2}$ and transmits a third ACK 318 to the second wireless communication device 302-$b$ at time $t_{3,3}$. The second wireless communication device 302-$b$ receives the third ACK 318 at time $t_{3,4}$. Similarly, in a fourth exchange, beginning at time $t_{4,1}$, the second wireless communication device 302-$b$ transmits a fourth FTM frame 320. The fourth FTM frame 320 includes a first field indicating the TOD of the third FTM frame 316 and a second field indicating the TOA of the third ACK 318. The first wireless communication device 302-$a$ receives the fourth FTM frame 320 at time $t_{4,2}$ and transmits a fourth ACK 322 to the second wireless communication device 302-$b$ at time $t_{4,3}$. The second wireless communication device 302-$b$ receives the fourth ACK 322 at time $t_{4,4}$.

The first wireless communication device 302-$a$ determines (such as obtains, identifies, ascertains, calculates, or computes) a range indication in accordance with the TODs and TOAs. For example, in implementations or instances in which an FTM burst includes four exchanges of FTM frames, the first wireless communication device 302-$a$ may determine (such as obtain, identify, ascertain, calculate, or compute) a round trip time (RTT) between itself and the second wireless communication device III02-$b$ in accordance with Equation 1.

$$RTT = \frac{1}{3}\left(\sum_{k=1}^{3} t_{4,k} - \sum_{k=1}^{3} t_{1,k}\right) - \left(\sum_{k=1}^{3} t_{3,k} - \sum_{k=1}^{3} t_{2,k}\right) \qquad (1)$$

In some implementations, the range indication is the RTT. Additionally, or alternatively, in some implementations, the first wireless communication device 302-a may determine (such as obtain, identify, ascertain, calculate, or compute) an actual approximate distance between itself and the second wireless communication device 302-b, for example, by multiplying the RTT by an approximate speed of light in the wireless medium. In such instances, the range indication may additionally, or alternatively, include the distance value. Additionally, or alternatively, the range indication may include an indication as to whether the second wireless communication device 302-b is within a proximity (such as a service discovery threshold) of the first wireless communication device 302-a in accordance with the RTT. In some implementations, the first wireless communication device 302-a may transmit the range indication to the second wireless communication device 302-b, for example, in a range report 324 at time $t_{5,1}$, which the second wireless communication device receives at time $t_{5,2}$.

Figure 4:
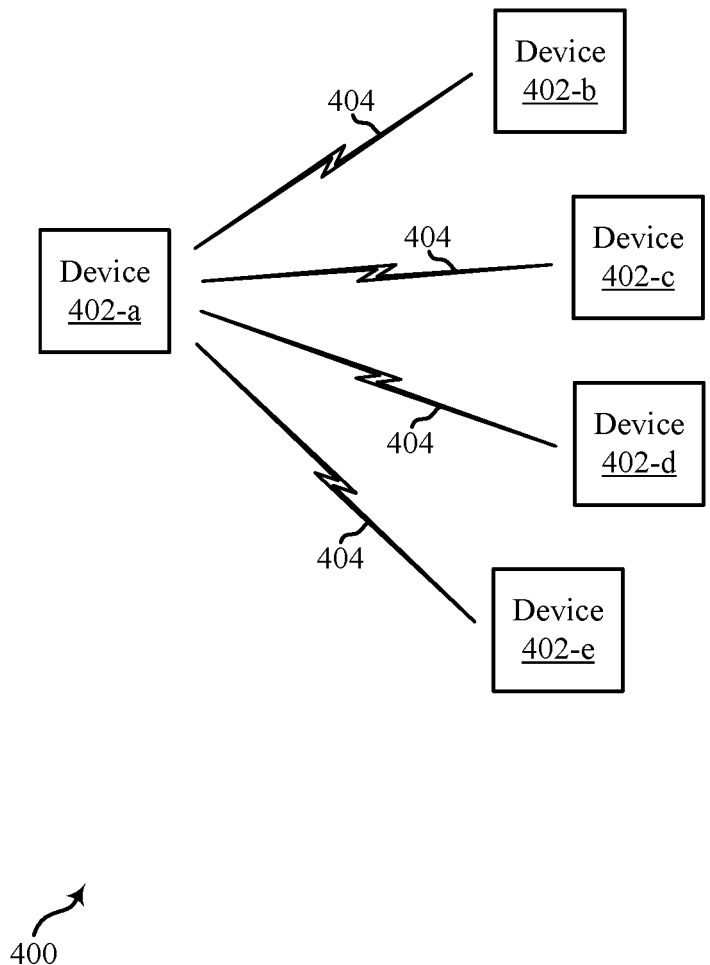
FIG. 4 shows an example of a signaling diagram that supports sounding for trigger-based ranging according to some aspects of the present disclosure.

FIG. 4 shows an example of a signaling diagram 400 that supports sounding for trigger-based ranging according to some aspects of the present disclosure. According to some aspects, the signaling diagram 400 can be an example of a mesh network, an IoT network or a sensor network in accordance with one or more of the IEEE 802.11 family of wireless communication protocol standards (including the 802.11ah amendment). The signaling diagram 400 may include multiple devices 402, such as a device 402-a, a device 402-b, a device 402-c, a device 402-d, and a device 402-e. In some implementations, the devices 402 may be examples of APs 102, STAs 104, or wireless communication devices 214, as described herein with reference to FIGS. 1 and 2. The device 402-a may communicate with the device 402-b, the device 402-c, the device 402-d, and the device 402-e via respective communication links 404, which may be examples of communication links 106 or Wi-Fi links 218, as described herein with reference to FIGS. 1 and 2.

The devices 402 may support performing ranging procedures or operations, as described herein, using MU techniques. For example, the device 402-a may support performing trigger-based ranging procedures for multiple neighboring devices 402, such as the device 402-b, the device 402-c, the device 402-d, and the device 402-e. Further, by using MU techniques (e.g., MU-MIMO, MU-OFDMA), the device 402-a may perform concurrent transmission and reception, which may improve the accuracy of ranging procedures by reducing or eliminating errors as a result of clock drift while supporting ranging procedures for multiple devices 402. In some examples, by using MU-MIMO techniques, the device 402-a may assign respective spatial streams to each of the neighbor devices 402, thereby supporting trigger-based ranging for the neighbor devices with a single time occasion for sounding signal transmissions via multiple spatial stream.

However, using MU-MIMO techniques, the quantity of spatial streams, and thus the quantity of supported neighbor devices 402, may be limited based on a quantity of antennas at the device 402-a. As such, to perform trigger-based ranging procedures for a quantity of neighbor wireless devices higher than the quantity of antennas, the device 402-a may perform an MU-MIMO ranging procedure multiple times. For example, the device 402-a may perform multiple trigger frame transmissions and receive sounding signals during multiple time occasions, and the device 402-a may transmit location measurement reports after receiving all of the sounding signals. This may cause a large time difference between transmission of a first sounding signal and transmission of the location measurement reports, which may deteriorate the accuracy of the trigger-based ranging procedures due to clock drift, for example. Further, MU-MIMO procedures may experience a reduced range of operation due to, for example, more stringent requirements (e.g., error vector magnitude (EVM) requirements) associated with MU-MIMO communications (e.g., relative to MU-OFDMA). As such, a coverage area for the ranging procedures may be smaller relative to non-MU-MIMO communications, such as MU-OFDMA.

In accordance with aspects as described herein, the device 402-a may divide a frequency bandwidth available to the device 402-a for ranging procedures into a plurality of subbands in accordance with OFDMA (e.g., MU-OFDMA) techniques. For example, the device 402-a may communicate with neighbor devices 402 via a frequency bandwidth of 320 MHz. However, a bandwidth of 80 MHz may be used for ranging procedures while still supporting sufficient location accuracy. As such, the device 402-a may divide the 320 MHz bandwidth into four 80 MHz subbands (contiguous subbands, for example), and allocate a respective subband to each of the device 402-b, the device 402-c, the device 402-d, and the device 402-e. In some other implementations, the device 402-a may be configured to divide the frequency bandwidth into a different quantity of subbands, for example, if the device 402-a operates based on a frequency bandwidth with a bandwidth size different than 320 MHz, the device 402-a divides the frequency bandwidth into subbands of a different bandwidth size than 80 MHz, or both. Similarly, each subband may have a same bandwidth size or different bandwidth sizes, which may lead to different quantities of subbands.

The device 402-a may transmit or broadcast a trigger frame via the frequency bandwidth to indicate each of the device 402-b, the device 402-c, the device 402-d, and the device 402-e to initiate a ranging procedure. The trigger frame may indicate a respective subband of the frequency bandwidth as an RU allocated to each of the device 402-b, the device 402-c, the device 402-d, and the device 402-e for transmission of a respective OFDMA sounding signal. Each of the device 402-b, the device 402-c, the device 402-d, and the device 402-e may transmit the respective OFDMA sounding signals to the device 402-a via the respective allocated subbands. Details regarding the ranging procedure are described in more detail herein, with reference to FIG. 5. Accordingly, the device 402-a may support ranging procedures using OFDMA techniques, which may allow for the device 402-a to support a quantity of devices 402 larger than a quantity of antennas at the device 402-a. Further, as the device 402-a may support a narrower bandwidth (e.g., by being able to support the use of one or more narrower bandwidth RUs) for each neighbor device 402 using MU-OFDMA techniques, the device 402-a may experience a larger range of operation for the ranging procedures (e.g., providing a range advantage relative to single user procedures or MU-MIMO procedures).

In some implementations, the device 402-a may be configured to perform ranging procedures using OFMDA and MU-MIMO techniques. For example, the device 402-a may divide the frequency bandwidth in accordance with OFDMA techniques, and the device 402-a may further allocate different spatial streams associated with different antennas of the device 402-*a* to different neighbor devices 402. As such, the trigger frame transmission may include an allocation for each device 402 that indicates a respective subband and a respective spatial stream. For instance, the device 402-*a* may have four spatial streams available, which may correspond to four antennas of the device 402-*a*. If the device 402-*a* divides a 320 MHz frequency bandwidth into four 80 MHz subbands, the device 402-*a* may support ranging procedures for 16 total devices 402, with a single time occasion for all sounding signal transmissions, by allocating one 80 MHz subband and one spatial stream to each device 402 of the 16 total devices 402.

In some implementations, the device 402-*b*, the device 402-*c*, the device 402-*d*, and the device 402-*e* may indicate a capability to support for OFDMA ranging procedures, OFDMA and MU-MIMO ranging procedures, an RU size, or any combination thereof, to the device 402-*a*. The capability may be indicated by a device 402 via a request message, such as an initial fine timing measurement request (IFTMR) message. Additionally, or alternatively, the capability indications may be included in subelement, such as a trigger-based specific subelement, or a protocol data unit, as described in more detail with reference to FIG. 7. Accordingly, the device 402-*a* may determine which technique to use, as well as a subband size for RU allocation, based on the support indications received from the devices 402.

The device 402-*a* may assign a respective subband of the plurality of subbands to a respective neighbor wireless device of a plurality of neighbor wireless devices in accordance with OFDMA techniques. The device 402-*a* may indicate the subband assignment via a trigger frame transmitted (or broadcasted) to the device 402-*b*, the device 402-*c*, the device 402-*d*, and the device 402-*e*. In some implementations, each subband may have a bandwidth size that corresponds to a respective RU size indicated in a capability indication. For example, the device 402-*b* may indicate an RU size of 120 MHz (such as via a capability indication), and the subband allocated to the device 402-*b* via the trigger frame may have a bandwidth size equal to or greater than 120 MHz. Other subbands may correspond to respective RU sizes indicated in capability indications or may be a default value selected by the device 402-*a* (such as 80 MHz). Each respective neighbor wireless device may transmit a respective sounding signal via each respective subband of the plurality of subbands during a same time occasion. Accordingly, the device 402-*a* may divide the available frequency bandwidth to support multi-user ranging procedures for larger quantities of wireless devices, such as quantities that exceed a quantity of antennas of the device 402-*a*.

Figure 5:
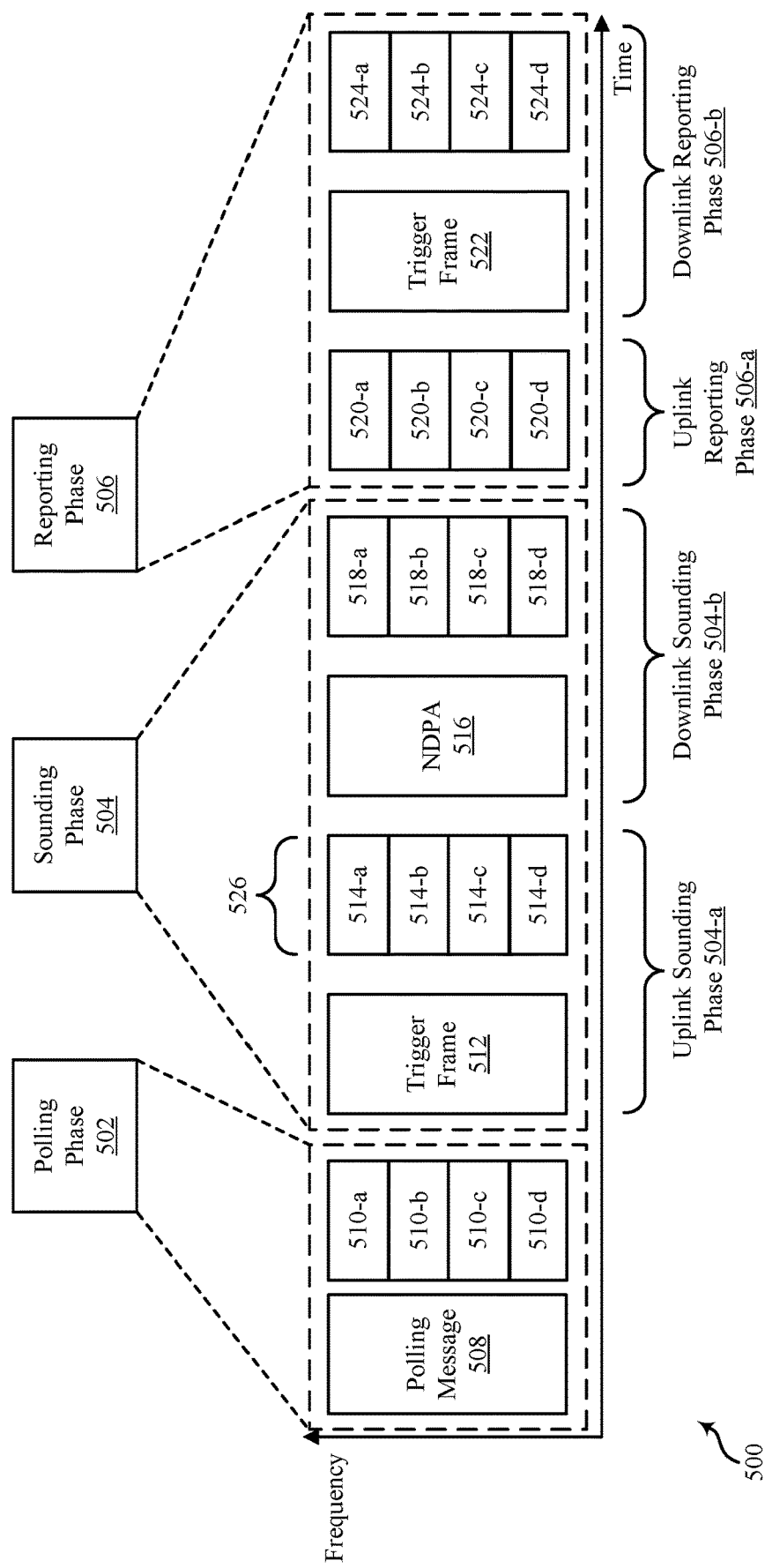
FIG. 5 shows an example of a ranging diagram that supports sounding for trigger-based ranging according to some aspects of the present disclosure.

FIG. 5 shows an example of a ranging diagram 500 that supports sounding for trigger-based ranging according to some aspects of the present disclosure. The ranging diagram 500 may illustrate timings of signaling exchanged during a multi-user ranging procedure (such as a location measurement procedure), as described herein. In this example, the multi-user ranging procedure is described with respect to a first wireless device (such as a wireless device 402 as described with reference to FIG. 4, an AP 102, a STA 104) and at least four neighbor wireless devices (such as wireless devices 402, APs 102, STAs 104).

In some implementations, the ranging diagram 500 may include a polling phase 502, a sounding phase 504, and a reporting phase 506. During the polling phase 502, the first wireless device may perform polling to determine a quantity of neighbor wireless devices participating in a location measurement procedure for which multi-user ranging is to be performed. For example, the first wireless device may transmit (such as broadcast) a polling message 508. In some implementations, the polling message 508 may be transmitted via a frequency bandwidth (such as an operating frequency bandwidth, the full frequency bandwidth) associated with the first wireless device. In response to receiving the polling message, the neighbor wireless devices may transmit a respective polling response message 510. For example, the first wireless device may receive a polling response message 510-*a*, a polling response message 510-*b*, a polling response message 510-*c*, and a polling response message 510-*d*. In some aspects, and as illustrated, the polling message 508 may indicate a time occasion for transmission of the polling response messages 510. Alternatively, the polling response messages 510 may be transmitted at different time occasions. Similarly, the polling response messages 510 may be transmitted via respective subbands (such as previously configured to the neighbor wireless devices) or via a same frequency band (such as the frequency bandwidth).

The first wireless device may determine a total quantity of neighbor wireless devices participating in the multi-user ranging procedure based on the polling phase 502. In some implementations, such as if the total quantity of neighbor wireless exceeds a quantity of devices supported for the frequency bandwidth, the first wireless device may divide the total quantity of neighbor wireless devices into sets, with each set having at most the quantity of devices supported for the frequency bandwidth. For example, if the first wireless device determines a total of eight neighbor wireless devices but can support four wireless devices for the frequency bandwidth (such as in when a 320 MHz frequency bandwidth is split into 80 MHz subbands), the first wireless may divide the eight neighbor wireless devices into two sets of four neighbor wireless devices.

In accordance with examples as described herein, the first wireless device may divide the frequency bandwidth available to the first wireless device into a plurality of subbands. The first wireless device may allocate a respective subband to a respective neighbor wireless device for transmissions of sounding signals 514 (such as OFDMA sounding signals) during the sounding phase 504. Accordingly, the first wireless device may support sounding signal 514 reception for a larger quantity of neighbor wireless devices, including quantities of neighbor wireless devices that exceed a quantity of antennas of the first wireless device.

During an uplink sounding phase 504-*a* of the sounding phase 504, the first wireless device may transmit a trigger frame 512. In some implementations, the trigger frame 512 may be transmitted via the full frequency bandwidth. The trigger frame 512 may indicate each respective subband of the plurality of subbands of the frequency bandwidth allocated to each neighbor wireless of a set of neighbor wireless devices. The trigger frame 512 may trigger the set of neighbor wireless devices to transmit a respective sounding signal 514 during a first time occasion 526 via a respective subband of the plurality of subbands.

The first wireless device may receive, during the first time occasion 526 (within the uplink sounding phase 504-*a*) and via the plurality of subbands, a plurality of sounding signals 514 from the neighbor wireless devices. For example, the first wireless device may receive a sounding signal 514-*a* via a first subband corresponding to a first neighbor wireless device, a sounding signal 514-*b* via a second subband corresponding to a second neighbor wireless device, a sounding signal 514-*c* via a third subband corresponding to a third neighbor wireless device, and a sounding signal 514-*d* via a fourth subband corresponding to a fourth neighbor wireless device. In some implementations, such as when the first wireless device has divided the total quantity of neighbor wireless devices into multiple sets, the first wireless device may repeat the transmission of the trigger frame 512 and the reception of the sounding signals 514 for each set of neighbor wireless devices. Accordingly, the first wireless device may measure the received uplink sounding signals 514 to generate location information corresponding to each of the neighbor wireless devices.

During a downlink sounding phase 504-b of the sounding phase 504, the first wireless device may transmit an NDP announcement (NDPA) 516 (for example, an announcement message, a ranging NDPA message) to the neighbor wireless devices. The message 516 may indicates each neighbor wireless device that the first wireless device is to transmit a sounding signal 518, and each neighbor wireless device may perform estimation of a time of arrival for the sounding signal 518 based on receiving the message 516. The first wireless device may transmit the sounding signal via the frequency bandwidth to the neighbor wireless devices. In some implementations, each respective neighbor wireless device may measure the sounding signal via each respective subband allocated to the respective neighbor wireless device. For example, four neighbor wireless devices may measure a sounding signal 518-a, a sounding signal 518-b, a sounding signal 518-c, and a sounding signal 518-d, respectively, via a respective allocated subband. Alternatively, each neighbor wireless devices may measure the sounding signal via the entire frequency bandwidth. In some implementations, whether a neighbor wireless device measured the sounding signal via an allocated subband or via the entire frequency bandwidth may be indicated by the neighbor wireless device to the first wireless device in a message (such as a measurement report 524).

During an uplink reporting phase 506-a of the reporting phase 506, the first wireless device may transmit one or more measurement reports indicating location information to one or more of the neighbor wireless devices based on reception of the respective uplink sounding signals 514. The uplink reporting phase 506-a may correspond to a downlink frame for the first wireless device to transmit the one or more measurement reports 520. The location information may include an estimation of a relative location of a neighbor wireless device (in relation to the first wireless device, for example) or an absolute location of the neighbor wireless device, a distance from the neighbor wireless device to the first wireless device or another device or object, information that may enable the neighbor wireless device to calculate a location of the neighbor wireless device (such as an RTT), or any combination thereof. In some implementations, the first wireless device may transmit a respective measurement report to each of the neighbor wireless devices via a respective allocated subband. For example, the first wireless device may transmit a measurement report 520-a, a measurement report 520-b, a measurement report 520-c, and a measurement report 520-d to a respective neighbor wireless device via a corresponding subband.

During a downlink reporting phase 506-b of the reporting phase 506, the first wireless device may transmit a trigger frame 522 (such as a location measurement report trigger frame) to trigger the neighbor wireless devices to each transmit a respective measurement report 524 associated with location information for the first wireless device based on the time of arrival estimation performed by each neighbor wireless device. The downlink reporting phase 506-b may correspond to an uplink frame for the first wireless device to transmit the trigger frame 522 and receive the respective measurement reports 524. For example, the first wireless device may receive a measurement report 524-a, a measurement report 524-b, a measurement report 524-c, and a measurement report 524-d, from the neighbor wireless devices. In some implementations, each measurement report 524 may be transmitted via a respective subband allocated to a corresponding neighbor wireless device. A measurement report 524 may indicate the estimated time of arrival performed by a neighbor wireless device, an error associate with the estimation of the time of arrival (for example, relative to the actual time of arrival of the sounding signal 518), or both. In some implementations, a measurement report 524 also may indicate that a neighbor wireless device performed estimation of the time of arrival of the sounding signal 518 based on receiving the sounding signal 518 via the entire frequency bandwidth. Alternatively, a measurement report 524 may indicate that a neighbor wireless device performed estimation of the time of arrival of the sounding signal 518 based on receiving the sounding signal 518 via a subband allocated to the neighbor wireless device.

Accordingly, by transmitting allocating subbands for transmission of the sounding signals 514 in accordance with OFDMA techniques, the first wireless device may support ranging procedures for larger quantities of neighbor wireless devices, including quantities of neighbor wireless devices that exceed the quantity of antennas of the first wireless device. This may reduce the quantity of occasions for transmission of the sounding signals 514, which may reduce clock drift between transmission of the trigger frame 512 and transmissions of the measurement reports 524, thereby increasing the accuracy of location measurement procedures.

Figure 6:
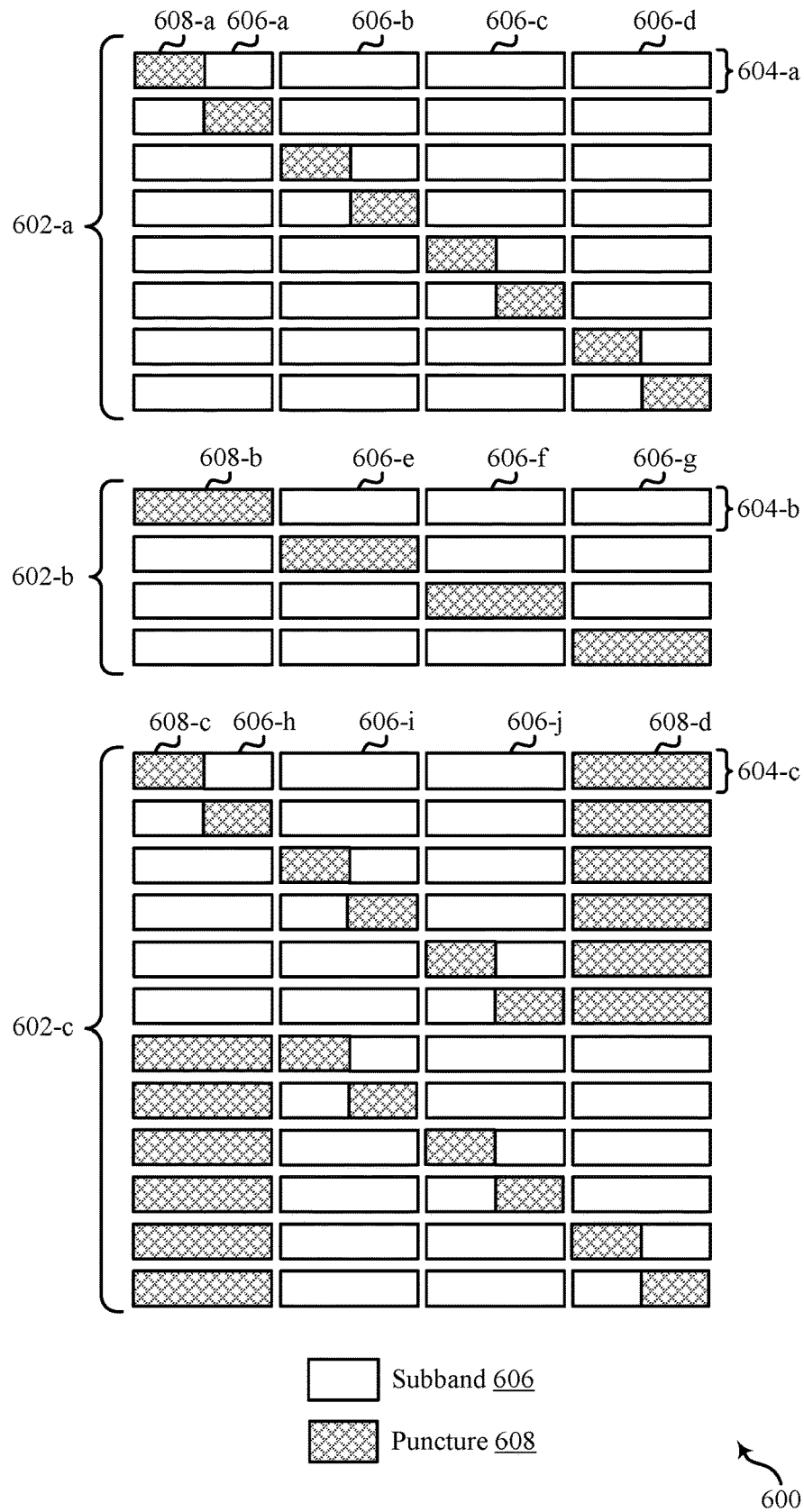
FIG. 6 shows an example of a puncturing diagram that supports sounding for trigger-based ranging according to some aspects of the present disclosure.

FIG. 6 shows an example of a puncturing diagram 600 that supports sounding for trigger-based ranging according to some aspects of the present disclosure. The puncturing diagram 600 may illustrate a puncturing method 602-a, a puncturing method 602-b, and a puncturing method 602-c. Each puncturing method 602 illustrates multiple examples of punctures 608 implemented on a frequency bandwidth 604 of a wireless device. In some implementations, each frequency bandwidth 604 may be an example of a 320 MHz bandwidth. In these implementations, the puncturing method 602-a may correspond to a 40 MHz puncturing method, the puncturing method 602-b may correspond to an 80 MHz puncturing method, and the puncturing method 602-c may correspond to a combined 80 MHz and 40 MHz puncturing method.

In some implementations, as a wireless device may generally allocate a contiguous bandwidth (80 MHz, for instance) to neighbor wireless devices for ranging procedures, a quantity of neighbor wireless devices supported for ranging procedures by a wireless device may vary depending on a puncturing method 602. For example, in the puncturing method 602-a, a frequency bandwidth 604-a may have a puncture 608-a (a 40 MHz puncture, for example), and the wireless device may be configured to assign subbands 606 of at least 80 MHz to each neighbor wireless device. As such, in the puncturing method 602-a, the wireless device may divide the frequency bandwidth 604-a into a subband 606-b, a subband 606-c, and a subband 606-d, which may support ranging procedures for up to three neighbor wireless devices. Alternatively, the wireless device may support allocating smaller subbands to some neighbor wireless devices. For example, the wireless device may allocate a subband 606-a to a fourth neighbor wireless device, which may allow the wireless device to support a same quantity of neighbor wireless devices for ranging procedures.

In the puncturing method 602-*b*, a frequency bandwidth 604-*b* may have a puncture 608-*b* (an 80 MHz puncture, for example), and the wireless device may be configured to assign subbands 606 of at least 80 MHz. As such, in the puncturing method 602-*b*, the wireless device may divide the frequency bandwidth 604-*b* into a subband 606-*e*, a subband 606-*f*, and a subband 606-*g*, which may support ranging procedures for up to three neighbor wireless devices. In some implementations, the same quantity of neighbor wireless devices may be supported for ranging procedures by allocating smaller subbands 606, such as 40 MHz subbands 606 or 20 MHz subbands 606, to at least some neighbor wireless devices.

In the puncturing method 602-*c*, a frequency bandwidth 604-*c* may have a puncture 608-*c* (a 40 MHz puncture, for example) and a puncture 608-*d* (an 80 MHz puncture, for example), and the wireless device may be configured to assign subbands 606 of at least 80 MHz. As such, in the puncturing method 602-*b*, the wireless device may divide the frequency bandwidth 604-*c* into a subband 606-*i* and a subband 606-*j*, which may support ranging procedures for two neighbor wireless devices. In some implementations, to support a higher quantity of neighbor wireless devices for ranging procedures, the wireless device may allocate smaller subbands 606, such as 40 MHz subbands 606 or 20 MHz subbands 606, to at least some neighbor wireless devices. For example, the wireless device may allocate a subband 606-*h* (a 40 MHz subband, for example) to a third neighbor wireless device.

Accordingly, the wireless device may support allocation of subbands 606 to neighbor wireless devices for ranging procedures and support puncturing of a frequency bandwidth 604, including static puncturing (where the frequency bandwidth 604 may have punctures 608 for any transmission, for example) and dynamic puncturing (where the frequency bandwidth 604 may have punctures 608 on a per-packet or per-transmission level).

FIG. 7 shows an example of a subelement 700 that supports sounding for trigger-based ranging according to some aspects of the present disclosure. The subelement 700 may be transmitted via a protocol data unit, such as a PPDU. In some implementations, the subelement 700 may be an example of a trigger-based specific subelement and may be transmitted via an initial FTM or IFTMR message by a transmitting device (for example a device 402, an AP 102, a STA 104).

The subelement 700 may include a plurality of fields. For example, the subelement 700 may include an identifier (ID) 702 field, which may correspond to a subelement ID associated with the subelement 700. In some implementations, the ID 702 field may have a length of 8 bits. The subelement 700 also may include a length 704 field, which may indicate a total length (such as in bits) of all fields included within the subelement 700. In some implementations, the length 704 field may have a length of 8 bits.

The subelement 700 may include an AID/ranging session ID (RSID) 706 field, which may indicate an identifier associated with a duration of an FTM session during which the subelement 700 is transmitted. For example, the AID/RSID 706 field may include an AID associated with the transmitting device (such as an initiating STA 104). If the transmitting device is not associated with any responder device (such as a responder STA 104) and does not have an AID assigned, the AID/RSID 706 field may include an RSID that may be used to identify the transmitting device. In some implementations, the AID/RSID 706 field may have a length of 16 bits.

The subelement 700 may include a device class 708 field, which may indicate a device class associated with the transmitting device. In some implementations, the device class 708 field may have a length of 1 bit. The subelement 700 also may include a MIMO 710 field. The MIMO 710 field may indicate support for full bandwidth UL MU-MIMO by the transmitting device. In some implementations, the MIMO 710 field may have a length of 1 bit. The values of the device class 708 field and the MIMO 710 field may be the same as values previously indicated by the transmitting device during an association procedure.

The subelement 700 may include a padding duration 712 field, which may correspond to a MAC padding duration for a trigger frame. The value of the padding duration 712 field may be the same as a value previously indicated by the transmitting device during an association procedure. The subelement 700 also may include a maximum session expiry 714 field. The maximum session expiry 714 field may correspond to a time duration before which a new measurement exchange between the transmitting device and a responder device should be initiated and completed. In some implementations, the time duration may be evaluated as a value of $2^{X+8}$ ms, where X corresponds to the value indicated in the maximum session expiry 714 field. The maximum session expiry 714 field may have a length of 4 bits.

The subelement 700 may include a passive ranging 716 field. The passive ranging 716 field may indicate whether the transmitting device is to grant passive trigger-based ranging procedures. In some implementations, the passive ranging 716 field may have a length of 1 bit. The subelement 700 also may include a reserved 718 field, which may be a portion of the subelement 700 reserved for indicating other information or otherwise not used. In some implementations, the reserved 718 field may have a length of 7 bits.

The subelement 700 may include an availability window 720, which may indicate a schedule (such as one or more resources) during which the transmitting device may be available for transmissions. In some implementations, the availability window 720 may have a variable bit length.

In some implementations, a wireless device may perform trigger-based ranging procedures in accordance with OFDMA techniques to increase a quantity of supported neighbor wireless devices. As such, the neighbor wireless devices may benefit from indicating a capability to support for OFDMA ranging procedures, OFDMA and MU-MIMO ranging procedures, an RU size supported for ranging procedures, or any combination thereof, to the wireless device. Accordingly, the subelement 700 may include an OFDMA 722 field, which may indicate whether the transmitting device supports UL MU-OFDMA techniques for trigger-based ranging procedures, as described herein. In some implementations, the subelement 700 also may include an OFDMA+MIMO 724 field, which may indicate whether the transmitting device supports combined UL MU-OFDMA and UL MU-MIMO techniques for trigger-based ranging procedures, as described herein.

The subelement 700 may additionally include an RU size 726 field, which may indicate a bandwidth size (such as a minimum bandwidth size) supported by the transmitting device for trigger-based ranging procedures, such that a subband allocated to the transmitting device has a bandwidth size equal to or greater than the indicated RU size 726. For example, a transmitting device may indicate an RU size 726 corresponding to 80 MHz, as this may be a minimum bandwidth size for the transmitting device to meet a ranging accuracy requirement for a location application of the transmitting device. The RU size 726 may indicate any bandwidth size, however, such as 160 MHz, 240 MHz, 320 MHz, 480 MHz, or 640 MHz.

Figure 8:
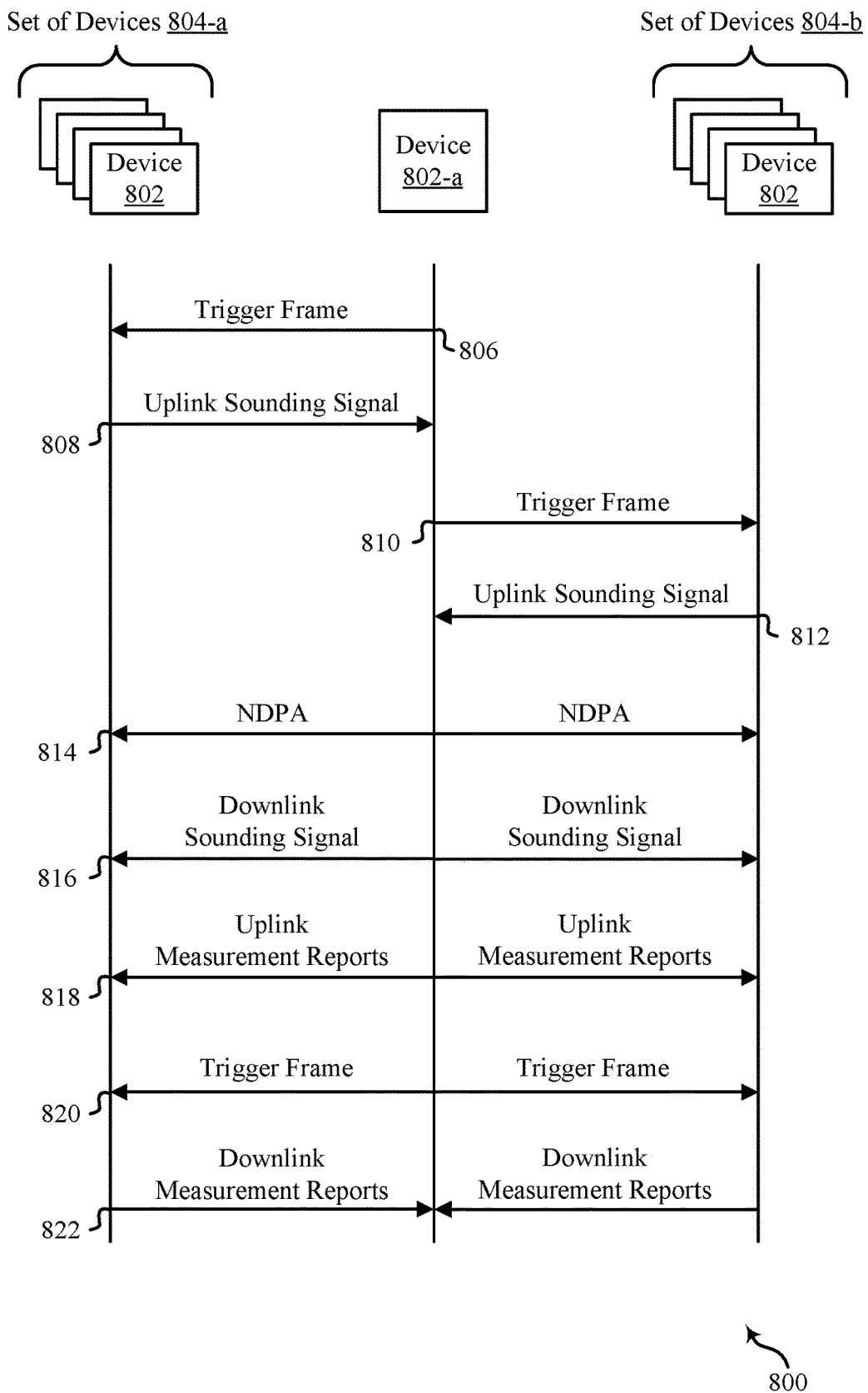
FIG. 8 shows an example of a process flow that supports sounding for trigger-based ranging according to some aspects of the present disclosure.

FIG. 8 shows an example of a process flow 800 that supports sounding for trigger-based ranging according to some aspects of the present disclosure. The process flow 800 illustrates communications between a device 802-*a*, a set of devices 804-*a* and a set of devices 804-*b*. The devices 802 may be examples of a device 402, an AP 102, or a STA 104, as described herein. In some implementations, the steps depicted in the process flow 800 may be rearranged or omitted. Additionally, some steps may be added to the process flow 800.

The devices 802-*a* may support performing ranging procedures or operations as described herein, with reference to FIGS. 2 through 7. For example, the device 802-*a* may support performing trigger-based ranging procedures for the set of devices 804-*a* and the set of devices 804-*b*. The device 802-*a* may support two spatial streams associated with two antennas of the device 802-*a*, which may allow the device to support using MU-MIMO techniques.

To perform trigger-based ranging procedures for eight devices 802 using MU-MIMO, the device 802-*a* may perform a first trigger frame transmission for a first two devices 802, receive a first two sounding signals from the first two devices 802, perform a second trigger frame transmission for a second two devices 802, receive a second two sounding signals from the second two devices 802, perform a third trigger frame transmission for a third two devices 802, receive a third two sounding signals from the third two devices 802, perform a fourth trigger frame transmission for a fourth two devices 802, and receive a fourth two sounding signals from the fourth two devices 802. The device 802-*a* may then transmit an announcement message (such as the message 516 as described with reference to FIG. 5) and transmit a downlink sounding signal (such as a sounding signal 518 as described with reference to FIG. 5) to the eight devices 802. Due to the large quantities of transmissions, there may be a large time difference between reception of the first sounding signal and transmission of the downlink sounding signal, which may deteriorate the accuracy of the trigger-based ranging procedures for the first two devices 802 due to clock drift. Similarly, the second two devices 802 may also experience ranging accuracy degradation due to clock drift between the second sounding signal and the downlink sounding signal. As such, techniques for reducing the quantities of transmissions (such as trigger frame and sounding signal transmissions) to reduce clock drift may be desired.

To reduce the total quantities of transmissions involved in a trigger-based ranging procedure, the device 802-*a* may support performing trigger-based ranging using MU-OFDMA techniques, as described herein. At 806, the device 802-*a* may transmit (such as broadcast) a first trigger frame to the set of devices 804-*a*. The trigger frame may indicate each device 802 of the set of devices 804-*a* of a respective subband of a plurality of subbands of a frequency bandwidth for transmitting an uplink sounding signal (such as an OFDMA sounding signal) during a first time occasion.

At 808, during the first time occasion, the set of devices 804-*a* may each transmit a respective uplink sounding signal (such as an OFDMA sounding signal) to the device 802-*a*. Each device 802 of the set of devices 804-*a* may transmit the respective uplink sounding signal via a respective allocated subband of the plurality of subbands.

At 810, the device 802-*a* may transmit (such as broadcast) a second trigger frame to the set of devices 804-*b*. The trigger frame may indicate each device 802 of the set of devices 804-*b* of a respective subband of a plurality of subbands of a frequency bandwidth for transmitting an uplink sounding signal (such as an OFDMA sounding signal) during a second time occasion.

At 812, during the second time occasion, the set of devices 804-*b* may each transmit a respective uplink sounding signal (such as an OFDMA sounding signal, as described herein) to the device 802-*a*. Each device 802 of the set of devices 804-*b* may transmit the respective uplink sounding signal via a respective allocated subband of the plurality of subbands.

At 814, the device 802-*a* may transmit (such as broadcast) an NDPA (for example, an announcement message, a NDPA message) to the set of devices 804-*a* and the set of devices 804-*b* indicating an occasion for transmission of a downlink sounding signal (such as an OFDMA sounding signal as described herein) by the device 802-*a*. Each device 802 of the set of devices 804-*a* and the set of devices 804-*b* may estimate a time of arrival of the downlink sounding signal based on receiving the NDPA for transmission of a respective measurement report. In some implementations, the estimation of the time of arrival may be based on whether a respective device 802 is to measure the downlink sounding signal to be transmitted by the device 802-*a* via the frequency bandwidth (such as the full frequency bandwidth) or via the respective subband allocated to the respective device 802.

At 816, the device 802-*a* may transmit the downlink sounding signal (such as an OFDMA sounding signal, as described herein) indicated by the announcement message to the set of devices 804-*a* and the set of devices 804-*b*. Each device 802 of the set of devices 804-*a* and the set of devices 804-*b* may calculate an error associated with the estimated time of arrival of the downlink sounding signal for transmission of a respective measurement report.

At 818, the device 802-*a* may transmit one or more measurement reports (such as uplink measurement reports) indicating location information to one or more of the neighbor wireless devices based on reception of the respective uplink sounding signals (for example, during a downlink frame). The location information may include an estimation of a relative location of a neighbor wireless device (in relation to the first wireless device, for example) or an absolute location of the neighbor wireless device, a distance from the neighbor wireless device to the first wireless device or another device or object, information that may enable the neighbor wireless device to calculate a location of the neighbor wireless device (such as an RTT), or any combination thereof. In some implementations, the first wireless device may transmit a respective measurement report to each of the neighbor wireless devices via a respective allocated subband.

At 820, the device 802-*a* may transmit a trigger frame (such as a location measurement report trigger frame) to trigger the set of devices 804-*a* and the set of devices 804-*b* to each transmit a respective measurement report associated with location information for the first wireless device based on the time of arrival estimation performed by each neighbor wireless device based on reception of the downlink sounding signal.

At 822, each device 802 of the set of devices 804-*a* and the set of devices 804-*b* may transmit a respective downlink measurement report to the device 802-*a* based on reception of the downlink sounding signal (for example, during an uplink frame). Each downlink measurement report may indicate the estimated time of arrival of the sounding signal, the error associated with the time of arrival estimation, or both. Each respective downlink measurement report may indicate whether the respective device 802 measured the sounding signal transmitted by the device 802-a via the frequency bandwidth or via the respective subband allocated to the respective device 802. In some implementations, at least some of the measurement reports may be transmitted during different time occasions (such as if some measurement reports are to be transmitted via a same frequency bandwidth).

Accordingly, by transmitting allocating subbands for transmission of the sounding signals in accordance with OFDMA techniques, the device 802-a may support ranging procedures for larger quantities of devices 802, including quantities of devices 802 that exceed the quantity of antennas of the device 802-a. This may reduce the quantity of occasions for transmission of the sounding signals and reduce clock drift between transmission of the trigger frame and transmissions of the measurement reports, thereby increasing the accuracy of location measurement procedures.

In some examples, the described techniques associated with performing ranging procedures using OFDMA (e.g., MU-OFDMA) communications may be combined with the use of secured and non-secured ranging communications. For example, physical (PHY) integrity check techniques may be implemented for the OFDMA communications (e.g., sounding signals) to improve security and the integrity of signals communicated by the device 802-a and neighbor devices 802.

Figure 9:
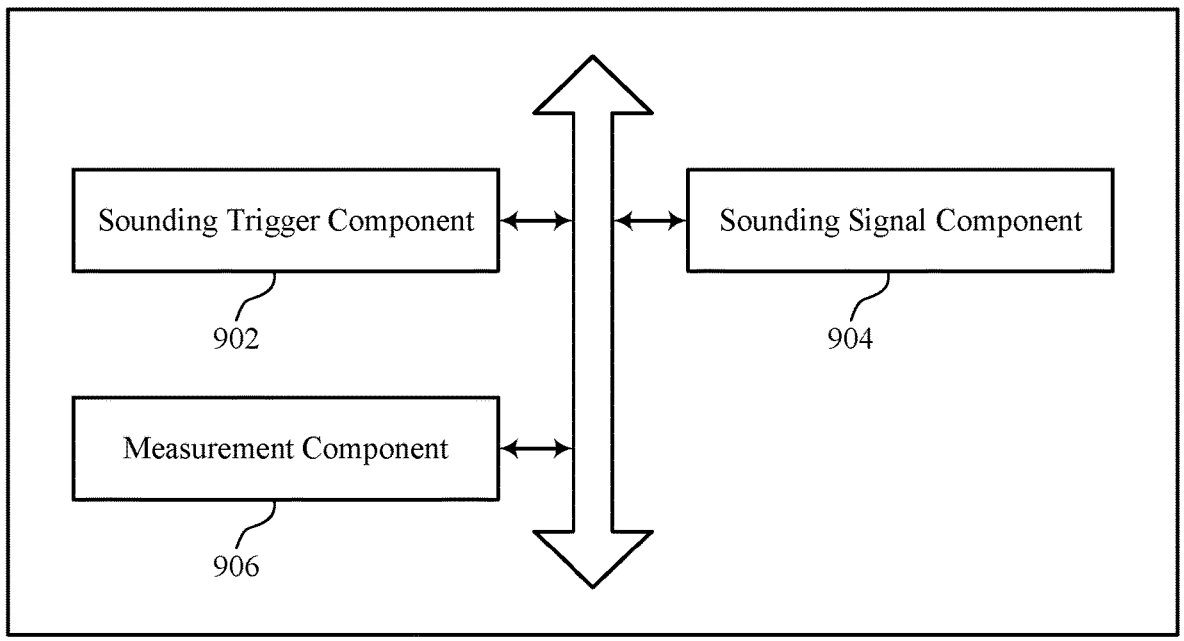
FIG. 9 shows a block diagram of an example wireless communication device that supports sounding for trigger-based ranging according to some aspects of the present disclosure.

FIG. 9 shows a block diagram of an example wireless communication device 900 that supports sounding for trigger-based ranging. In various examples, the wireless communication device 900 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "at least one processor"); one or more radios (collectively "at least one radio"); and one or more memories or memory blocks (collectively "at least one memory"). In some implementations, the at least one processor may include multiple processors, and the at least one memory may include multiple memories. One or more of the multiple processors may be coupled with one or more of the multiple memories which may, individually or collectively, be configured to perform various functions described herein (as part of a processing system).

In some implementations, the wireless communication device 900 can be a device for use in an AP 102 or STA 104, as described with reference to FIG. 1. In some other examples, the wireless communication device 900 can be an AP or STA that includes such a chip, SoC, chipset, package, or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 900 also includes or can be coupled with at least one application processor which may be further coupled with at least one memory. In some implementations, the wireless communication device 900 further includes at least one external network interface that enables communication with a core network or backhaul network to gain access to external networks including the Internet.

The wireless communication device 900 includes a sounding trigger component 902, a sounding signal component 904, and a measurement component 906. Portions of one or more of the sounding trigger component 902, the sounding signal component 904, and the measurement component 906 may be implemented at least in part in hardware or firmware. For example, one or more of the sounding trigger component 902, the sounding signal component 904, and the measurement component 906 may be implemented at least in part by at least one modem. In some implementations, at least some of the sounding trigger component 902, the sounding signal component 904, and the measurement component 906 are implemented at least in part by at least one processor and as software stored in at least one memory. For example, portions of one or more of the sounding trigger component 902, the sounding signal component 904, and the measurement component 906 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce a set of outputs (which may be passed to other systems or components of, for example, the device 900). For example, a processing system of the device 900 may refer to a system including the various other components or sub-components of the device 900, such as the at least one processor, or at least one transceiver, or at least one communications manager, or other components or combinations of components of the device 900. The processing system of the device 900 may interface with other components of the device 900, and may process information received from other components (such as inputs or signals) or output information to other components. For example, a chip or modem of the device 900 may include a processing system, a first interface to output information and a second interface to obtain information. In some implementations, the first interface may refer to an interface between the processing system of the chip or modem and a transmitter, such that the device 900 may transmit information output from the chip or modem. In some implementations, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

The sounding trigger component 902 is capable of, configured to, or operable to support a means for transmitting, by the first wireless device, a first trigger frame to trigger a first set of multiple neighbor wireless devices to each transmit an OFDMA sounding signal during a first time occasion, the first trigger frame indicating a respective subband of a set of multiple subbands of a frequency bandwidth allocated to a respective neighbor wireless device of the first set of multiple neighbor wireless devices. The sounding signal component 904 is capable of, configured to, or operable to support a means for receiving, during the first time occasion and via the set of multiple subbands, a set of multiple OFDMA sounding signals from the first set of multiple neighbor wireless devices. The measurement component 906 is capable of, configured to, or operable to support a means for transmitting at least one measurement report indicating location information for at least one neighbor wireless device of the first set of multiple neighbor wireless devices based on the set of multiple OFDMA sounding signals.

In some implementations, the sounding trigger component 902 is capable of, configured to, or operable to support a means for transmitting, by the first wireless device, a second trigger frame to trigger a second set of multiple neighbor wireless devices to each transmit an OFDMA sounding signal during a second time occasion, the second trigger frame indicating a respective subband of the set of multiple subbands of the frequency bandwidth allocated to a respective neighbor wireless device of the second set of multiple neighbor wireless devices. In some implementations, the measurement component 906 is capable of, configured to, or operable to support a means for receiving, during the second time occasion and via the set of multiple subbands, a set of multiple OFDMA sounding signals from the second set of multiple neighbor wireless devices.

In some implementations, the sounding trigger component 902 is capable of, configured to, or operable to support a means for transmitting a polling message via the frequency bandwidth to determine a total quantity of neighbor wireless devices participating in a location measurement procedure. In some implementations, the sounding trigger component 902 is capable of, configured to, or operable to support a means for receiving, in response to the polling message, a respective polling response message from each neighbor wireless device of the first set of multiple neighbor wireless devices and the second set of multiple neighbor wireless devices, where the first trigger frame and the second trigger frame are transmitted during separate time occasions based on the total quantity of neighbor wireless devices.

In some implementations, the first trigger frame indicates multiple spatial streams assigned to a respective neighbor wireless device of the first set of multiple neighbor wireless devices for transmitting a respective OFDMA sounding signal via a respective subband of the set of multiple subbands.

In some implementations, the first trigger frame indicates a single spatial stream, of a set of multiple spatial streams, assigned to a respective neighbor wireless device of the first set of multiple neighbor wireless devices for transmitting a respective OFDMA sounding signal via a respective subband of the set of multiple subbands. In some implementations, a quantity of the first set of multiple neighbor wireless devices to which the first trigger frame is transmitted is based on a bandwidth puncturing scheme.

In some implementations, a first subband of the set of multiple subbands has a first bandwidth size smaller than a second bandwidth size associated with a second subband of the set of multiple subbands. In some implementations, the first trigger frame indicates a first neighbor wireless device of the first set of multiple neighbor wireless devices that the first subband has the first bandwidth size.

In some implementations, the sounding signal component 904 is capable of, configured to, or operable to support a means for transmitting, to the first set of multiple neighbor wireless devices, an announcement message indicating transmission of a sounding signal. In some implementations, the sounding signal component 904 is capable of, configured to, or operable to support a means for transmitting, via the frequency bandwidth, the sounding signal to the first set of multiple neighbor wireless devices. In some implementations, the measurement component 906 is capable of, configured to, or operable to support a means for receiving, from at least one neighbor wireless device of the first set of multiple neighbor wireless devices, a second measurement report that indicates an estimation of a time of arrival of the sounding signal and an error associated with the estimation of the time of arrival.

In some implementations, the second measurement report indicates that the at least one neighbor wireless device estimated the time of arrival of the sounding signal based on receiving the sounding signal via the frequency bandwidth. In some implementations, the second measurement report indicates that the at least one neighbor wireless device estimated the time of arrival of the sounding signal based on receiving the sounding signal via a respective subband of the set of multiple subbands.

In some implementations, the sounding trigger component 902 is capable of, configured to, or operable to support a means for transmitting or receiving a request message indicating a capability to support OFDMA sounding signals for a location measurement procedure.

In some implementations, the sounding signal component 904 is capable of, configured to, or operable to support a means for transmitting or receiving a request message indicating a capability to support sounding signals using combined OFDMA and MIMO techniques for a location measurement procedure.

In some implementations, the sounding trigger component 902 is capable of, configured to, or operable to support a means for receiving one or more request messages, each request message indicating a bandwidth size, where the frequency bandwidth is divided into the set of multiple subbands based on the one or more request messages indicating the bandwidth size, a respective subband of the set of multiple subbands having a size equal to or larger than each bandwidth size of each respective request message of the one or more request messages.

In some implementations, a quantity of the first set of multiple neighbor wireless devices exceeds a quantity of antennas of the first wireless device. In some implementations, the first wireless device includes a station or an access point. In some implementations, each neighbor wireless device of the first set of multiple neighbor wireless devices includes a station or an access point.

In some implementations, the sounding trigger component 902 is capable of, configured to, or operable to support a means for receiving, from a first wireless device, a trigger frame to trigger a set of multiple neighbor wireless devices, the set of multiple neighbor wireless devices including the first neighbor wireless device, to transmit an OFDMA sounding signal during a first time occasion, the trigger frame indicating a first subband of a set of multiple subbands of a frequency bandwidth allocated to the first neighbor wireless device. In some implementations, the sounding signal component 904 is capable of, configured to, or operable to support a means for transmitting, during the first time occasion and via the first subband, one or more OFDMA sounding signals to the first wireless device. In some implementations, the measurement component 906 is capable of, configured to, or operable to support a means for receiving a measurement report indicating location information for the first neighbor wireless device based on transmitting the one or more OFDMA sounding signals.

In some implementations, the trigger frame indicates multiple spatial streams assigned to the first neighbor wireless device for transmitting a respective OFDMA sounding signal via the first subband. In some implementations, the trigger frame indicates a single spatial stream, of a set of multiple spatial streams, assigned to the first neighbor wireless device for transmitting a respective OFDMA sounding signal via the first subband.

In some implementations, the sounding trigger component 902 is capable of, configured to, or operable to support a means for receiving a polling message via the frequency bandwidth associated with determining a total quantity of neighbor wireless devices participating in a location measurement procedure. In some implementations, the sounding trigger component 902 is capable of, configured to, or operable to support a means for transmitting, in response to the polling message, a polling response message to the first wireless device.

In some implementations, the first subband has a first bandwidth size smaller than a second bandwidth size associated with a second subband of the set of multiple subbands assigned to a second neighbor wireless device of the set of multiple neighbor wireless devices. In some implementations, the trigger frame indicates the first neighbor wireless device that the first subband has the first bandwidth size.

In some implementations, the measurement component 906 is capable of, configured to, or operable to support a means for estimating a time of arrival of a sounding signal based on receiving an announcement message from the first wireless device. In some implementations, the measurement component 906 is capable of, configured to, or operable to support a means for receiving the sounding signal from the first wireless device. In some implementations, the measurement component 906 is capable of, configured to, or operable to support a means for transmitting, to the first wireless device, a second measurement report indicating an estimated time of arrival of the sounding signal and an error associated with the estimated time of arrival.

In some implementations, the second measurement report indicates that the first neighbor wireless device estimated the time of arrival of the sounding signal based on receiving the sounding signal on the frequency bandwidth. In some implementations, the second measurement report indicates that the first neighbor wireless device estimated the time of arrival of the sounding signal based on receiving the sounding signal on the first subband.

In some implementations, the sounding signal component 904 is capable of, configured to, or operable to support a means for transmitting or receiving a request message indicating a capability to support OFDMA sounding signals for a location measurement procedure. In some implementations, the sounding signal component 904 is capable of, configured to, or operable to support a means for transmitting or receiving a request message indicating a capability to support sounding signals using combined OFDMA and MIMO techniques for a location measurement procedure.

In some implementations, the sounding trigger component 902 is capable of, configured to, or operable to support a means for transmitting a request message including a bandwidth size, where the first subband has a size equal to or larger than the bandwidth size based on transmitting the request message.

In some implementations, a quantity of the set of multiple neighbor wireless devices exceeds a quantity of antennas of the first wireless device. In some implementations, the first wireless device includes a station or an access point. In some implementations, the first neighbor wireless device includes a station or an access point.

Figure 10:
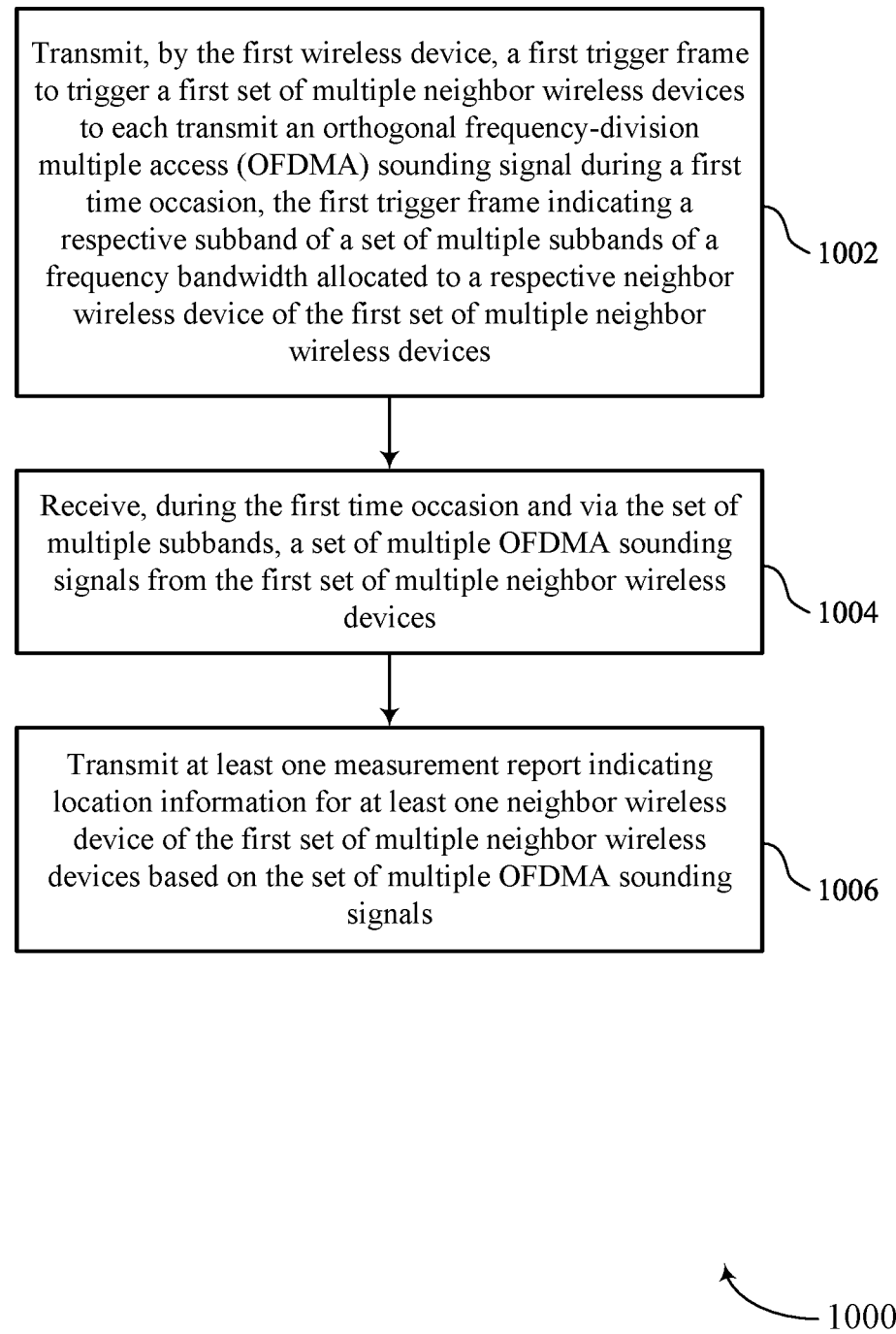
FIGS. 10 and 11 show flowcharts illustrating example processes that support sounding for trigger-based ranging according to some aspects of the present disclosure.

FIG. 10 shows a flowchart illustrating a method 1000 that supports sounding for trigger-based ranging. The operations of the method 1000 may be implemented by an AP or a STA or its components as described herein. For example, the operations of the method 1000 may be performed by an AP or a STA as described with reference to FIG. 1-9. In some implementations, an AP or a STA may execute a set of instructions to control the functional elements of the wireless AP or the wireless STA to perform the described functions. Additionally, or alternatively, the wireless AP or the wireless STA may perform aspects of the described functions using special-purpose hardware.

In some implementations, in block 1002, the wireless AP or the wireless STA may transmit, by the first wireless device, a first trigger frame to trigger a first set of multiple neighbor wireless devices to each transmit an OFDMA sounding signal during a first time occasion, the first trigger frame indicating a respective subband of a set of multiple subbands of a frequency bandwidth allocated to a respective neighbor wireless device of the first set of multiple neighbor wireless devices. The operations of block 1002 may be performed in accordance with examples as disclosed herein. In some implementations, aspects of the operations of block 1002 may be performed by a sounding trigger component 902 as described with reference to FIG. 9.

In some implementations, in block 1004, the wireless AP or the wireless STA may receive, during the first time occasion and via the set of multiple subbands, a set of multiple OFDMA sounding signals from the first set of multiple neighbor wireless devices. The operations of block 1004 may be performed in accordance with examples as disclosed herein. In some implementations, aspects of the operations of block 1004 may be performed by a sounding signal component 904 as described with reference to FIG. 9.

In some implementations, in block 1006, the wireless AP or the wireless STA may transmit at least one measurement report indicating location information for at least one neighbor wireless device of the first set of multiple neighbor wireless devices based on the set of multiple OFDMA sounding signals. The operations of block 1006 may be performed in accordance with examples as disclosed herein. In some implementations, aspects of the operations of block 1006 may be performed by a measurement component 906 as described with reference to FIG. 9.

Figure 11:
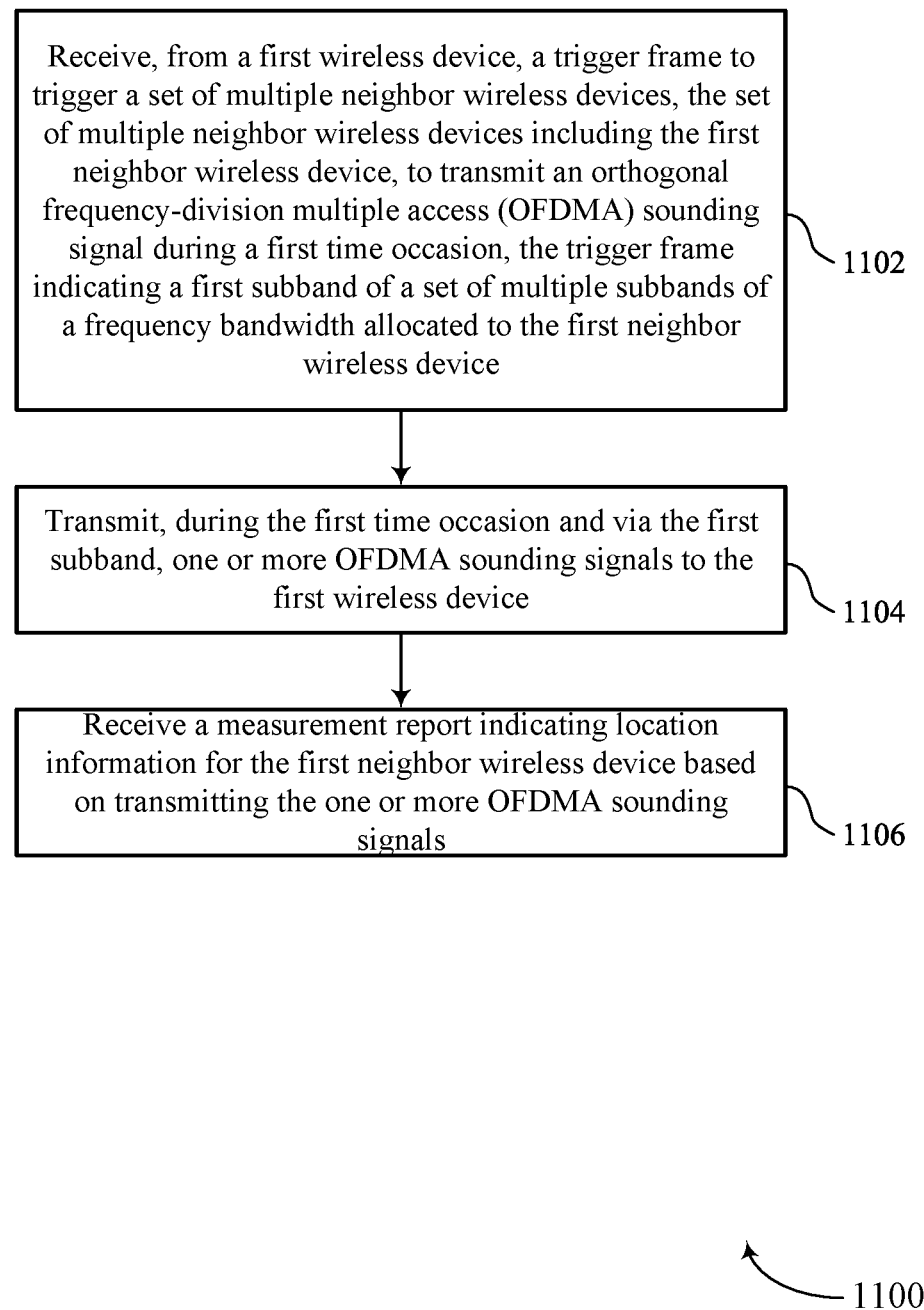

FIG. 11 shows a flowchart illustrating a method 1100 that supports sounding for trigger-based ranging. The operations of the method 1100 may be implemented by an AP or a STA or its components as described herein. For example, the operations of the method 1100 may be performed by an AP or a STA as described with reference to FIG. 1-9. In some implementations, an AP or a STA may execute a set of instructions to control the functional elements of the wireless AP or the wireless STA to perform the described functions. Additionally, or alternatively, the wireless AP or the wireless STA may perform aspects of the described functions using special-purpose hardware.

In some implementations, in block 1102, the wireless AP or the wireless STA may receive, from a first wireless device, a trigger frame to trigger a set of multiple neighbor wireless devices, the set of multiple neighbor wireless devices including the first neighbor wireless device, to transmit an OFDMA sounding signal during a first time occasion, the trigger frame indicating a first subband of a set of multiple subbands of a frequency bandwidth allocated to the first neighbor wireless device. The operations of block 1102 may be performed in accordance with examples as disclosed herein. In some implementations, aspects of the operations of block 1102 may be performed by a sounding trigger component 902 as described with reference to FIG. 9.

In some implementations, in block 1104, the wireless AP or the wireless STA may transmit, during the first time occasion and via the first subband, one or more OFDMA sounding signals to the first wireless device. The operations of block 1104 may be performed in accordance with examples as disclosed herein. In some implementations, aspects of the operations of block 1104 may be performed by a sounding signal component 904 as described with reference to FIG. 9.

In some implementations, in block 1106, the wireless AP or the wireless STA may receive a measurement report indicating location information for the first neighbor wireless device based on transmitting the one or more OFDMA sounding signals. The operations of block 1106 may be performed in accordance with examples as disclosed herein. In some implementations, aspects of the operations of block 1106 may be performed by a measurement component 906 as described with reference to FIG. 9.

Implementation examples are described in the following numbered clauses:

Aspect 1: A method at a first wireless device, comprising: transmitting, by the first wireless device, a first trigger frame to trigger a first plurality of neighbor wireless devices to each transmit an OFDMA sounding signal during a first time occasion, the first trigger frame indicating a respective subband of a plurality of subbands of a frequency bandwidth allocated to a respective neighbor wireless device of the first plurality of neighbor wireless devices; receiving, during the first time occasion and via the plurality of subbands, a plurality of OFDMA sounding signals from the first plurality of neighbor wireless devices; and transmitting at least one measurement report indicating location information for at least one neighbor wireless device of the first plurality of neighbor wireless devices based at least in part on the plurality of OFDMA sounding signals.

Aspect 2: The method of aspect 1, further comprising: transmitting, by the first wireless device, a second trigger frame to trigger a second plurality of neighbor wireless devices to each transmit an OFDMA sounding signal during a second time occasion, the second trigger frame indicating a respective subband of the plurality of subbands of the frequency bandwidth allocated to a respective neighbor wireless device of the second plurality of neighbor wireless devices; and receiving, during the second time occasion and via the plurality of subbands, a plurality of OFDMA sounding signals from the second plurality of neighbor wireless devices.

Aspect 3: The method of aspect 2, further comprising: transmitting a polling message via the frequency bandwidth to determine a total quantity of neighbor wireless devices participating in a location measurement procedure; and receiving, in response to the polling message, a respective polling response message from each neighbor wireless device of the first plurality of neighbor wireless devices and the second plurality of neighbor wireless devices, wherein the first trigger frame and the second trigger frame are transmitted during separate time occasions based at least in part on the total quantity of neighbor wireless devices.

Aspect 4: The method of any of aspects 1 through 3, wherein the first trigger frame indicates multiple spatial streams assigned to a respective neighbor wireless device of the first plurality of neighbor wireless devices for transmitting a respective OFDMA sounding signal via a respective subband of the plurality of subbands.

Aspect 5: The method of any of aspects 1 through 3, wherein the first trigger frame indicates a single spatial stream, of a plurality of spatial streams, assigned to a respective neighbor wireless device of the first plurality of neighbor wireless devices for transmitting a respective OFDMA sounding signal via a respective subband of the plurality of subbands.

Aspect 6: The method of any of aspects 1 through 5, wherein a quantity of the first plurality of neighbor wireless devices to which the first trigger frame is transmitted is based at least in part on a bandwidth puncturing scheme.

Aspect 7: The method of aspect 6, wherein a first subband of the plurality of subbands has a first bandwidth size smaller than a second bandwidth size associated with a second subband of the plurality of subbands, and the first trigger frame indicates a first neighbor wireless device of the first plurality of neighbor wireless devices that the first subband has the first bandwidth size.

Aspect 8: The method of any of aspects 1 through 7, further comprising: transmitting, to the first plurality of neighbor wireless devices, an announcement message indicating transmission of a sounding signal; transmitting, via the frequency bandwidth, the sounding signal to the first plurality of neighbor wireless devices; and receiving, from at least one neighbor wireless device of the first plurality of neighbor wireless devices, a second measurement report that indicates an estimation of a time of arrival of the sounding signal and an error associated with the estimation of the time of arrival.

Aspect 9: The method of aspect 8, wherein the second measurement report indicates that the at least one neighbor wireless device estimated the time of arrival of the sounding signal based on receiving the sounding signal via the frequency bandwidth.

Aspect 10: The method of aspect 8, wherein the second measurement report indicates that the at least one neighbor wireless device estimated the time of arrival of the sounding signal based on receiving the sounding signal via a respective subband of the plurality of subbands.

Aspect 11: The method of any of aspects 1 through 10, further comprising: transmitting or receiving a request message indicating a capability to support OFDMA sounding signals for a location measurement procedure.

Aspect 12: The method of any of aspects 1 through 11, further comprising: transmitting or receiving a request message indicating a capability to support sounding signals using combined OFDMA and MIMO techniques for a location measurement procedure.

Aspect 13: The method of any of aspects 1 through 12, further comprising: receiving one or more request messages, each request message indicating a bandwidth size, wherein the frequency bandwidth is divided into the plurality of subbands based at least in part on the one or more request messages indicating the bandwidth size, a respective subband of the plurality of subbands having a size equal to or larger than each bandwidth size of each respective request message of the one or more request messages.

Aspect 14: The method of any of aspects 1 through 13, wherein a quantity of the first plurality of neighbor wireless devices exceeds a quantity of antennas of the first wireless device.

Aspect 15: The method of any of aspects 1 through 14, wherein the first wireless device comprises a station or an access point.

Aspect 16: The method of any of aspects 1 through 15, wherein each neighbor wireless device of the first plurality of neighbor wireless devices comprises a station or an access point.

Aspect 17: A method at a first neighbor wireless device, comprising: receiving, from a first wireless device, a trigger frame to trigger a plurality of neighbor wireless devices, the plurality of neighbor wireless devices including the first neighbor wireless device, to transmit an OFDMA sounding signal during a first time occasion, the trigger frame indicating a first subband of a plurality of subbands of a frequency bandwidth allocated to the first neighbor wireless device; transmitting, during the first time occasion and via the first subband, one or more OFDMA sounding signals to the first wireless device; and receiving a measurement report indicating location information for the first neighbor wireless device based at least in part on transmitting the one or more OFDMA sounding signals.

Aspect 18: The method of aspect 17, wherein the trigger frame indicates multiple spatial streams assigned to the first neighbor wireless device for transmitting a respective OFDMA sounding signal via the first subband.

Aspect 19: The method of aspect 17, wherein the trigger frame indicates a single spatial stream, of a plurality of spatial streams, assigned to the first neighbor wireless device for transmitting a respective OFDMA sounding signal via the first subband.

Aspect 20: The method of any of aspects 17 through 19, further comprising: receiving a polling message via the frequency bandwidth associated with determining a total quantity of neighbor wireless devices participating in a location measurement procedure; and transmitting, in response to the polling message, a polling response message to the first wireless device.

Aspect 21: The method of any of aspects 17 through 20, wherein the first subband has a first bandwidth size smaller than a second bandwidth size associated with a second subband of the plurality of subbands assigned to a second neighbor wireless device of the plurality of neighbor wireless devices, and the trigger frame indicates the first neighbor wireless device that the first subband has the first bandwidth size.

Aspect 22: The method of any of aspects 17 through 21, further comprising: estimating a time of arrival of a sounding signal based at least in part on receiving an announcement message from the first wireless device; receiving the sounding signal from the first wireless device; and transmitting, to the first wireless device, a second measurement report indicating an estimated time of arrival of the sounding signal and an error associated with the estimated time of arrival.

Aspect 23: The method of aspect 22, wherein the second measurement report indicates that the first neighbor wireless device estimated the time of arrival of the sounding signal based on receiving the sounding signal on the frequency bandwidth.

Aspect 24: The method of aspect 22, wherein the second measurement report indicates that the first neighbor wireless device estimated the time of arrival of the sounding signal based on receiving the sounding signal on the first subband.

Aspect 25: The method of any of aspects 17 through 24, further comprising: transmitting or receiving a request message indicating a capability to support OFDMA sounding signals for a location measurement procedure.

Aspect 26: The method of any of aspects 17 through 25, further comprising: transmitting or receiving a request message indicating a capability to support sounding signals using combined OFDMA and MIMO techniques for a location measurement procedure.

Aspect 27: The method of any of aspects 17 through 26, further comprising: transmitting a request message including a bandwidth size, wherein the first subband has a size equal to or larger than the bandwidth size based at least in part on transmitting the request message.

Aspect 28: The method of any of aspects 17 through 27, wherein a quantity of the plurality of neighbor wireless devices exceeds a quantity of antennas of the first wireless device.

Aspect 29: The method of any of aspects 17 through 28, wherein the first wireless device comprises a station or an access point.

Aspect 30: The method of any of aspects 17 through 29, wherein the first neighbor wireless device comprises a station or an access point.

Aspect 31: An apparatus comprising at least one processor; at least one memory coupled with the at least one processor; and instructions stored in the at least one memory and executable by the at least one processor to cause the apparatus to perform a method of any of aspects 1 through 16.

Aspect 32: An apparatus comprising at least one means for performing a method of any of aspects 1 through 16.

Aspect 33: A non-transitory computer-readable medium storing code the code comprising instructions executable by a processor to perform a method of any of aspects 1 through 16.

Aspect 34: An apparatus comprising at least one processor; at least one memory coupled with the at least one processor; and instructions stored in the at least one memory and executable by the at least one processor to cause the apparatus to perform a method of any of aspects 17 through 30.

Aspect 35: An apparatus comprising at least one means for performing a method of any of aspects 17 through 30.

Aspect 36: A non-transitory computer-readable medium storing code the code comprising instructions executable by a processor to perform a method of any of aspects 17 through 30.

As used herein, the term "determine" or "determining" encompasses a wide variety of actions and, therefore, "determining" can include calculating, computing, processing, deriving, investigating, looking up (such as via looking up in a table, a database, or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'"

or "based at least in part on 'a,'" may be based on "a" alone or based on a combination of "a" and one or more other factors, conditions, or information.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be beneficial. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless device, comprising:
   at least one processor;
   at least one memory coupled with the at least one processor; and
   instructions stored in the at least one memory and executable by the at least one processor to cause the first wireless device to:
      transmit a first trigger frame to trigger a first plurality of neighbor wireless devices to each transmit an orthogonal frequency-division multiple access (OFDMA) sounding signal during a first time occasion, the first trigger frame indicating a respective subband of a plurality of subbands of a frequency bandwidth allocated to a respective neighbor wireless device of the first plurality of neighbor wireless devices;
      receive, during the first time occasion and via the plurality of subbands, a plurality of OFDMA sounding signals from the first plurality of neighbor wireless devices; and
      transmit at least one measurement report indicating location information for at least one neighbor wireless device of the first plurality of neighbor wireless devices based at least in part on the plurality of OFDMA sounding signals.

2. The first wireless device of claim 1, wherein the instructions are further executable by the at least one processor to cause the first wireless device to:
   transmit a second trigger frame to trigger a second plurality of neighbor wireless devices to each transmit an OFDMA sounding signal during a second time occasion, the second trigger frame indicating a respective subband of the plurality of subbands of the frequency bandwidth allocated to a respective neighbor wireless device of the second plurality of neighbor wireless devices; and
   receive, during the second time occasion and via the plurality of subbands, a plurality of OFDMA sounding signals from the second plurality of neighbor wireless devices.

3. The first wireless device of claim 2, wherein the instructions are further executable by the at least one processor to cause the first wireless device to:
   transmit a polling message via the frequency bandwidth to determine a total quantity of neighbor wireless devices participating in a location measurement procedure; and
   receive, in response to the polling message, a respective polling response message from each neighbor wireless device of the first plurality of neighbor wireless devices and the second plurality of neighbor wireless devices, wherein the first trigger frame and the second trigger frame are transmitted during separate time occasions based at least in part on the total quantity of neighbor wireless devices.

4. The first wireless device of claim 1, wherein the first trigger frame indicates multiple spatial streams assigned to a respective neighbor wireless device of the first plurality of neighbor wireless devices for transmitting a respective OFDMA sounding signal via a respective subband of the plurality of subbands.

5. The first wireless device of claim 1, wherein the first trigger frame indicates a single spatial stream, of a plurality of spatial streams, assigned to a respective neighbor wireless device of the first plurality of neighbor wireless devices for transmitting a respective OFDMA sounding signal via a respective subband of the plurality of subbands.

6. The first wireless device of claim 1, wherein a quantity of the first plurality of neighbor wireless devices to which the first trigger frame is transmitted is based at least in part on a bandwidth puncturing scheme.

7. The first wireless device of claim 6, wherein:
a first subband of the plurality of subbands has a first bandwidth size smaller than a second bandwidth size associated with a second subband of the plurality of subbands, and
the first trigger frame indicates a first neighbor wireless device of the first plurality of neighbor wireless devices that the first subband has the first bandwidth size.

8. The first wireless device of claim 1, wherein the instructions are further executable by the at least one processor to cause the first wireless device to:
transmit, to the first plurality of neighbor wireless devices, an announcement message indicating transmission of a sounding signal;
transmit, via the frequency bandwidth, the sounding signal to the first plurality of neighbor wireless devices; and
receive, from at least one neighbor wireless device of the first plurality of neighbor wireless devices, a second measurement report that indicates an estimation of a time of arrival of the sounding signal and an error associated with the estimation of the time of arrival.

9. The first wireless device of claim 8, wherein the second measurement report indicates that the at least one neighbor wireless device estimated the time of arrival of the sounding signal based on receiving the sounding signal via the frequency bandwidth.

10. The first wireless device of claim 8, wherein the second measurement report indicates that the at least one neighbor wireless device estimated the time of arrival of the sounding signal based on receiving the sounding signal via a respective subband of the plurality of subbands.

11. The first wireless device of claim 1, wherein the instructions are further executable by the at least one processor to cause the first wireless device to:
transmit or receive a request message indicating a capability to support OFDMA sounding signals for a location measurement procedure.

12. The first wireless device of claim 1, wherein the instructions are further executable by the at least one processor to cause the first wireless device to:
transmit or receive a request message indicating a capability to support sounding signals using combined OFDMA and multiple-input multiple-output (MIMO) techniques for a location measurement procedure.

13. The first wireless device of claim 1, wherein the instructions are further executable by the at least one processor to cause the first wireless device to:
receive one or more request messages, each request message indicating a bandwidth size, wherein the frequency bandwidth is divided into the plurality of subbands based at least in part on the one or more request messages indicating the bandwidth size, a respective subband of the plurality of subbands having a size equal to or larger than each bandwidth size of each respective request message of the one or more request messages.

14. The first wireless device of claim 1, wherein a quantity of the first plurality of neighbor wireless devices exceeds a quantity of antennas of the first wireless device.

15. The first wireless device of claim 1, wherein the first wireless device comprises a station or an access point.

16. The first wireless device of claim 1, wherein each neighbor wireless device of the first plurality of neighbor wireless devices comprises a station or an access point.

17. A first neighbor wireless device, comprising:
at least one processor;
at least one memory coupled with the at least one processor; and
instructions stored in the at least one memory and executable by the at least one processor to cause the first neighbor wireless device to:
receive, from a first wireless device, a trigger frame to trigger a plurality of neighbor wireless devices, the plurality of neighbor wireless devices including the first neighbor wireless device, to transmit an orthogonal frequency-division multiple access (OFDMA) sounding signal during a first time occasion, the trigger frame indicating a first subband of a plurality of subbands of a frequency bandwidth allocated to the first neighbor wireless device;
transmit, during the first time occasion and via the first subband, one or more OFDMA sounding signals to the first wireless device; and
receive a measurement report indicating location information for the first neighbor wireless device based at least in part on transmitting the one or more OFDMA sounding signals.

18. The first neighbor wireless device of claim 17, wherein the trigger frame indicates multiple spatial streams assigned to the first neighbor wireless device for transmitting a respective OFDMA sounding signal via the first subband.

19. The first neighbor wireless device of claim 17, wherein the trigger frame indicates a single spatial stream, of a plurality of spatial streams, assigned to the first neighbor wireless device for transmitting a respective OFDMA sounding signal via the first subband.

20. The first neighbor wireless device of claim 17, wherein the instructions are further executable by the at least one processor to cause the first neighbor wireless device to:
receive a polling message via the frequency bandwidth associated with determining a total quantity of neighbor wireless devices participating in a location measurement procedure; and
transmit, in response to the polling message, a polling response message to the first wireless device.

21. The first neighbor wireless device of claim 17, wherein:
the first subband has a first bandwidth size smaller than a second bandwidth size associated with a second subband of the plurality of subbands assigned to a second neighbor wireless device of the plurality of neighbor wireless devices, and
the trigger frame indicates that the first subband has the first bandwidth size.

22. The first neighbor wireless device of claim 17, wherein the instructions are further executable by the at least one processor to cause the first neighbor wireless device to:

estimate a time of arrival of a sounding signal based at least in part on receiving an announcement message from the first wireless device;

receive the sounding signal from the first wireless device; and transmit, to the first wireless device, a second measurement report indicating an estimated time of arrival of the sounding signal and an error associated with the estimated time of arrival.

23. The first neighbor wireless device of claim 22, wherein the second measurement report indicates that the time of arrival was of the sounding signal was estimated based on receiving the sounding signal on the frequency bandwidth.

24. The first neighbor wireless device of claim 22, wherein the second measurement report indicates that the time of arrival of the sounding signal was estimated based on receiving the sounding signal on the first subband.

25. The first neighbor wireless device of claim 17, wherein the instructions are further executable by the at least one processor to cause the first neighbor wireless device to:
transmit or receive a request message indicating a capability to support OFDMA sounding signals for a location measurement procedure.

26. The first neighbor wireless device of claim 17, wherein the instructions are further executable by the at least one processor to cause the first neighbor wireless device to:
transmit or receive a request message indicating a capability to support sounding signals using combined OFDMA and multiple-input multiple-output (MIMO) techniques for a location measurement procedure.

27. The first neighbor wireless device of claim 17, wherein the instructions are further executable by the at least one processor to cause the first neighbor wireless device to:
transmit a request message including a bandwidth size, wherein the first subband has a size equal to or larger than the bandwidth size based at least in part on transmitting the request message.

28. The first neighbor wireless device of claim 17, wherein a quantity of the plurality of neighbor wireless devices exceeds a quantity of antennas of the first wireless device.

29. A method at a first wireless device, comprising:
transmitting, by the first wireless device, a first trigger frame to trigger a first plurality of neighbor wireless devices to each transmit an orthogonal frequency-division multiple access (OFDMA) sounding signal during a first time occasion, the first trigger frame indicating a respective subband of a plurality of subbands of a frequency bandwidth allocated to a respective neighbor wireless device of the first plurality of neighbor wireless devices;

receiving, during the first time occasion and via the plurality of subbands, a plurality of OFDMA sounding signals from the first plurality of neighbor wireless devices; and transmitting at least one measurement report indicating location information for at least one neighbor wireless device of the first plurality of neighbor wireless devices based at least in part on the plurality of OFDMA sounding signals.

30. A method at a first neighbor wireless device, comprising:
receiving, from a first wireless device, a trigger frame to trigger a plurality of neighbor wireless devices, the plurality of neighbor wireless devices including the first neighbor wireless device, to transmit an orthogonal frequency-division multiple access (OFDMA) sounding signal during a first time occasion, the trigger frame indicating a first subband of a plurality of subbands of a frequency bandwidth allocated to the first neighbor wireless device;

transmitting, during the first time occasion and via the first subband, one or more OFDMA sounding signals to the first wireless device; and receiving a measurement report indicating location information for the first neighbor wireless device based at least in part on transmitting the one or more OFDMA sounding signals.

* * * * *